(12) United States Patent
Kong et al.

(10) Patent No.: US 11,995,279 B2
(45) Date of Patent: May 28, 2024

(54) TOUCH PANEL AND TOUCH DISPLAY DEVICE COMPRISING THE SAME

(71) Applicant: LG Display Co., Ltd., Seoul (KR)

(72) Inventors: MinSuk Kong, Gyeongsangbuk-do (KR); MiRae Lee, Seoul (KR); YoungJun Jeon, Ulsan (KR); HyunHo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/851,700

(22) Filed: Jun. 28, 2022

(65) Prior Publication Data

US 2023/0004257 A1 Jan. 5, 2023

(30) Foreign Application Priority Data

Jun. 30, 2021 (KR) ........................ 10-2021-0085409

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/0446* (2019.05)

(58) Field of Classification Search
CPC ..... G06F 3/0445; G06F 3/0412; G06F 3/0446
See application file for complete search history.

(56) References Cited

U.S. PATENT DOCUMENTS

| 2010/0085326 | A1* | 4/2010 | Anno | H03K 17/9622 |
| | | | | 345/174 |
| 2015/0123911 | A1* | 5/2015 | Poliakov | G06F 3/0412 |
| | | | | 29/829 |
| 2015/0363020 | A1* | 12/2015 | Chen | G06F 3/0412 |
| | | | | 345/174 |
| 2018/0039352 | A1* | 2/2018 | Wu | H10K 77/111 |
| 2019/0129552 | A1* | 5/2019 | Lee | G06F 3/0412 |
| 2019/0220123 | A1* | 7/2019 | Kanaya | H10K 59/40 |
| 2019/0332210 | A1* | 10/2019 | Lee | G06F 3/044 |
| 2019/0377456 | A1* | 12/2019 | Kwak | G06F 3/0446 |
| 2020/0201483 | A1* | 6/2020 | Feng | G06F 3/0445 |
| 2021/0028241 | A1* | 1/2021 | Kim | H01L 27/1248 |
| 2021/0126227 | A1* | 4/2021 | Choi | H01L 51/5268 |

\* cited by examiner

*Primary Examiner* — Md Saiful A Siddiqui
(74) *Attorney, Agent, or Firm* — Seed IP Law Group LLP

(57) ABSTRACT

The present disclosure relates to a touch panel and a touch display device including the same. A touch panel includes a plurality of first touch electrodes disposed on a first insulating layer, a second insulating layer disposed on the plurality of first touch electrodes and the first insulating layer, a plurality of second touch electrodes disposed on the second insulating layer, and a third insulating layer disposed on the plurality of second touch electrodes and the second insulating layer. A refractive index of each of the first insulating layer, the second insulating layer and the third insulating layer is the same as each other. Accordingly, it is possible to improve the visibility of the touch display device.

30 Claims, 11 Drawing Sheets

FIG.11

|  |  | Example 1 |  | Example 2 |  |
|---|---|---|---|---|---|
| Reflection Luminosity | 12° |  | 0.02cd |  | 0.01cd |
|  | 42° |  | 0.0002cd |  | 0.0001cd |

TOUCH PANEL AND TOUCH DISPLAY DEVICE COMPRISING THE SAME

CROSS REFERENCE TO RELATED APPLICATION

This application claims priority from Korean Patent Application No. 10-2021-0085409, filed on Jun. 30, 2021, which is hereby incorporated by reference for all purposes as if fully set forth herein.

BACKGROUND

Technical Field

Embodiments of the present disclosure relates to a touch panel and a touch display device including the same, more particularly, to a touch panel having excellent viewing angle characteristics and a touch display device including the same.

Description of the Related Art

A touch display device may include a display panel for displaying an image and a touch panel for receiving a touch of a user.

As the display panel, there may be utilized various display panels such as a liquid crystal display panel, a plasma display panel, and an electroluminescent display panel (e.g., an organic light emitting display panel). In particular, the electroluminescent display panel has an excellent viewing angle, contrast ratio, etc., and can be lightweight and thin and has advantages of low power consumption since a separate light is not required.

In addition, a touch panel may be configured to detect an input signal by a user's hand or an object.

BRIEF SUMMARY

The inventors have recognized that, in the case that a display panel of the touch display device is an electroluminescent display panel, there is a problem in that visibility may be deteriorated due to reflection of external light. In particular, there is a problem in that external light reflected from the touch panel is recognized as a rainbow color.

Accordingly, the inventors of the present disclosure have invented a touch panel capable of improving visibility even if an electroluminescent display panel is used as a display panel of the touch display unit, and a new structure of a touch display device including the same.

Embodiments of the present disclosure provide a touch panel capable of improving visibility and a touch display device including the same.

Embodiments of the present disclosure provide a touch panel capable of reducing external light reflectance and a touch display device including the same.

Embodiments of the present disclosure provide a touch panel capable of preventing an adhesion defect in attaching a display panel and a touch panel, and a touch display device including the same.

Technical features and benefits of the present disclosure are not limited to those mentioned above, and other technical features and benefits may be inferred from the following embodiments.

In an embodiment of the present disclosure, there is provided a touch display device capable of improving visibility and reducing external light reflectance.

A touch panel is disposed on a display panel including an active area and a non-active area surrounding the active area, wherein the touch panel comprises a first insulating layer which is disposed on the display panel, a second insulating layer is disposed on the first insulating layer, and a third insulating layer is disposed on the second insulating layer.

A touch display device includes a plurality of first touch electrodes disposed between the first insulating layer and the second insulating layer, and a plurality of second touch electrodes disposed between the second insulating layer and the third insulating layer. Each of the plurality of first touch electrodes overlaps a respective one of the plurality of second touch electrodes, and a refractive index of each of the first insulating layer, the second insulating layer and the third insulating layer is the same as each other.

According to embodiments of the present disclosure, there is provided a touch panel capable of improving visibility and reducing external light reflectance.

The touch panel includes a plurality of first touch electrodes disposed on a first insulating layer, a second insulating layer disposed on the plurality of first touch electrodes and the first insulating layer, a plurality of second touch electrodes disposed on the second insulating layer, and a third insulating layer disposed on the plurality of second touch electrodes and the second insulating layer, wherein a refractive index of each of the first insulating layer, the second insulating layer and the third insulating layer is the same as each other.

According to embodiments of the present disclosure, there are provided the first, second and third insulating layers having refractive indices corresponding to each other, so that there is an effect of improving visibility by preventing the external light reflected in the touch panel from being recognized by the user as a light of the rainbow color.

In addition, according to embodiments of the present disclosure, since external light is absorbed in the touch display device or is trapped in the touch display device and is unlikely to or cannot be emitted to the outside, there is an effect of lowering the reflectance of external light.

In addition, according to embodiments of the present disclosure, the surface of the first insulating layer of the touch panel which is in contact with the insulating layer disposed on the display panel has a flat shape, so that it is possible to prevent adhesion defect in attaching the display panel and the touch panel.

However, the effects of the present disclosure are not limited to the above-mentioned effects, and other effects not mentioned may be understood clearly to those of ordinary skill in the art to which this disclosure belongs from the description below.

BRIEF DESCRIPTION OF THE SEVERAL VIEWS OF THE DRAWINGS

FIG. 11 illustrates a reflection luminosity of the touch display device of the embodiments of the present disclosure according to the viewing angle.

DETAILED DESCRIPTION

Figure 1:
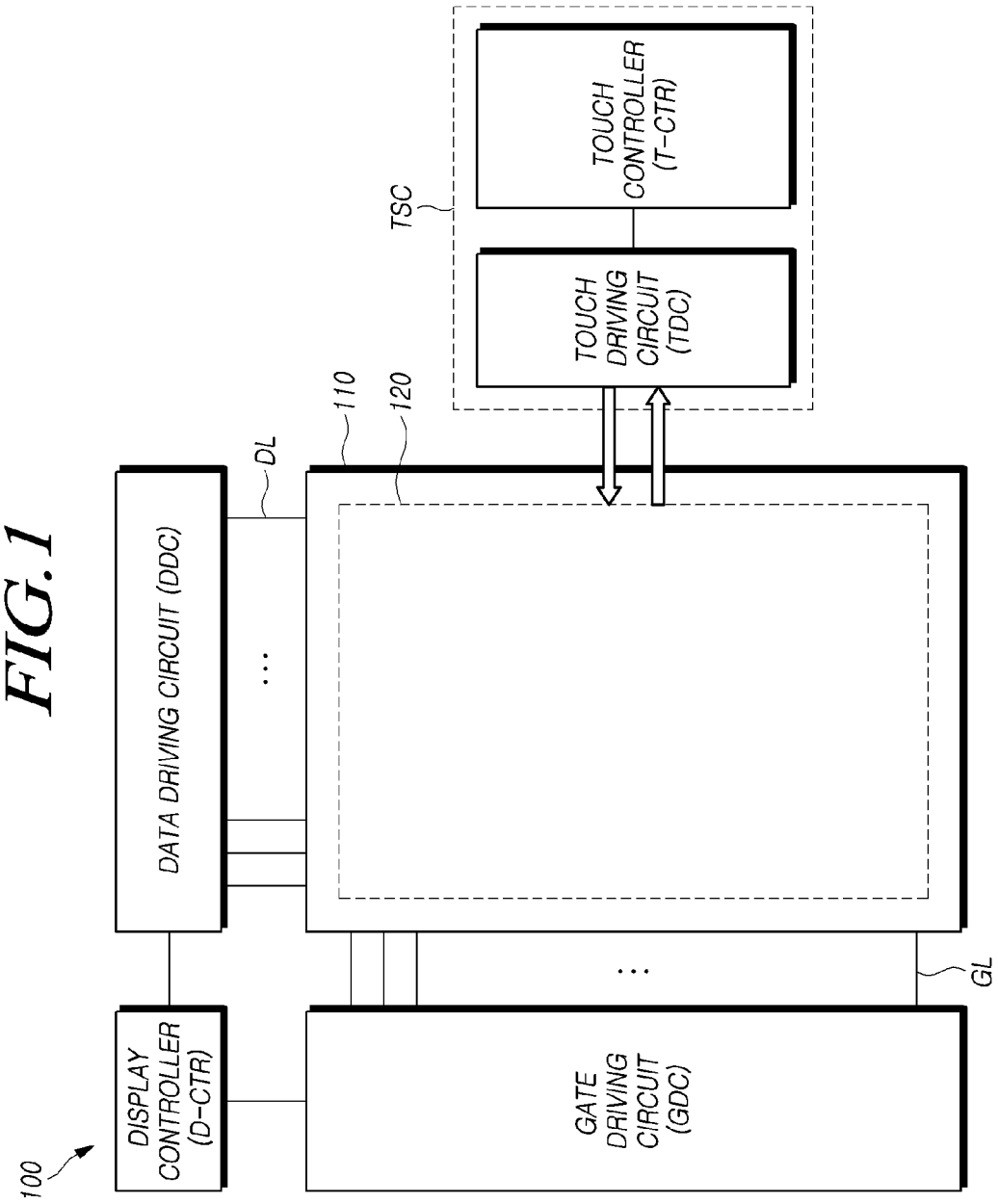
FIG. 1 is a system configuration diagram of a touch display device according to embodiments of the present disclosure.

The advantages and features of the present disclosure and a method therefor will become apparent with reference to the embodiments described below in detail in conjunction with the accompanying drawings. However, the present disclosure is not limited to the embodiments disclosed below, but will be implemented in various different forms. The present embodiments are provided to explain the disclosure of the present specification, and to completely inform those of ordinary skill in the art of this specification the scope of the disclosure.

The shape, size, ratio, angle, number, etc., disclosed in the drawings for explaining the embodiment in the present specification are examples, and the embodiment of the present specification is not limited to the illustrated matters. In addition, in describing the embodiment, if it is determined that a detailed description of a related known technology may unnecessarily obscure the gist of the embodiment, the detailed description thereof will be omitted. The same reference numerals refer to same elements in the entire specification. In the case that the terms of 'include,' 'have,' 'consist,' 'comprise,' etc., are used in this specification, it should be understood as being able to add other parts or elements unless 'only' is used. When an element is expressed in the singular, this may be understood to include cases including the plural unless otherwise explicitly stated.

In addition, in interpreting the elements, it should be interpreted as including an error range even if there is no separate explicit description.

In the description related to spatial relationship, for example, when the positional relationship of two element is described using the terms of "on," "upper," "above," "below," "under," "beneath," "lower," "near," "close," "adjacent," it should be interpreted that one or more elements may be further "interposed" between the elements unless the terms such as "directly," "only" are used.

In the case of a description of a temporal relationship, for example, when a temporal relationship is described as 'after,' 'following,' 'next,' 'then,' 'before,' it may include cases that are not continuous unless 'immediately' or 'directly' is used.

When the terms, such as "first," "second," or the like, are used herein to describe various elements or components, it should be considered that these elements or components are not limited thereto. These terms are merely used herein for distinguishing an element from other elements. Therefore, a first element mentioned below may be a second element in a technical concept of the present disclosure.

The features of each of the embodiments of the present specification may be partially or wholly combined or coupled with each other, and may be various technically linked or operated. In addition, each of the embodiments may be implemented independently of each other or may be implemented together in a related relationship.

Hereinafter, embodiments of the present disclosure will be described with reference to the drawings.

FIG. 1 is a system configuration diagram of a touch display device according to embodiments of the present disclosure.

Referring to FIG. 1, a touch display device according to the embodiments of the present disclosure may provide an image display function for displaying an image and a touch sensing function for sensing a user's touch.

The touch display device 100 according to the embodiments of the present disclosure may include, for displaying an image, a display panel DISP on which data lines DL and gate lines GL are disposed, and a display driving circuit for driving the display panel DISP.

The display driving circuit may include a data driving circuit DDC for driving data lines, a gate driving circuit GDC for driving gate lines, a display controller D-CTR for controlling the data driving circuit DDC and gate driving circuit GDC, and the like.

The touch display device 100 according to the embodiments of the present disclosure may include, for sensing a touch, a touch panel 120 on which a plurality of touch electrodes are disposed as a touch sensor, and a touch sensing circuit TSC for driving the touch panel 120 and performing sensing processing.

The touch sensing circuit TSC may supply a driving signal to the touch panel 120 to drive the touch panel 120, detect a sensing signal from the touch panel 120, and sense touch presence and/or touch position (touch coordinates) based on the sensing signal.

The touch sensing circuit TSC may be implemented by including a touch driving circuit TDC for supplying the driving signal and receiving the sensing signal, a touch controller T-CTR for calculating the presence or absence of a touch and/or a touch position (touch coordinates), and the like.

The touch sensing circuit TSC may be implemented as one or more components (e.g., an integrated circuit), and may be implemented separately from the display driving circuit.

In addition, all or a part of the touch sensing circuit TSC may be implemented by being integrated with one or more of a display driving circuit or an internal circuit thereof. For example, the touch driving circuit TDC of the touch sensing circuit TSC may be implemented as an integrated circuit together with the data driving circuit DDC of the display driving circuit.

Meanwhile, the touch display device 100 according to the embodiments of the present disclosure may sense a touch based on capacitance formed in the touch electrodes TE.

For example, the touch display device 100 according to the embodiments of the present disclosure may sense a touch using a mutual-capacitance and/or self-capacitance-based touch sensing method, as a capacitance-based touch sensing method. However, in the following description, for convenience of explanation, the touch display device 100 according to the embodiments of the present specification will be mainly described with respect to a capacitance-based touch sensing method.

Figure 2:
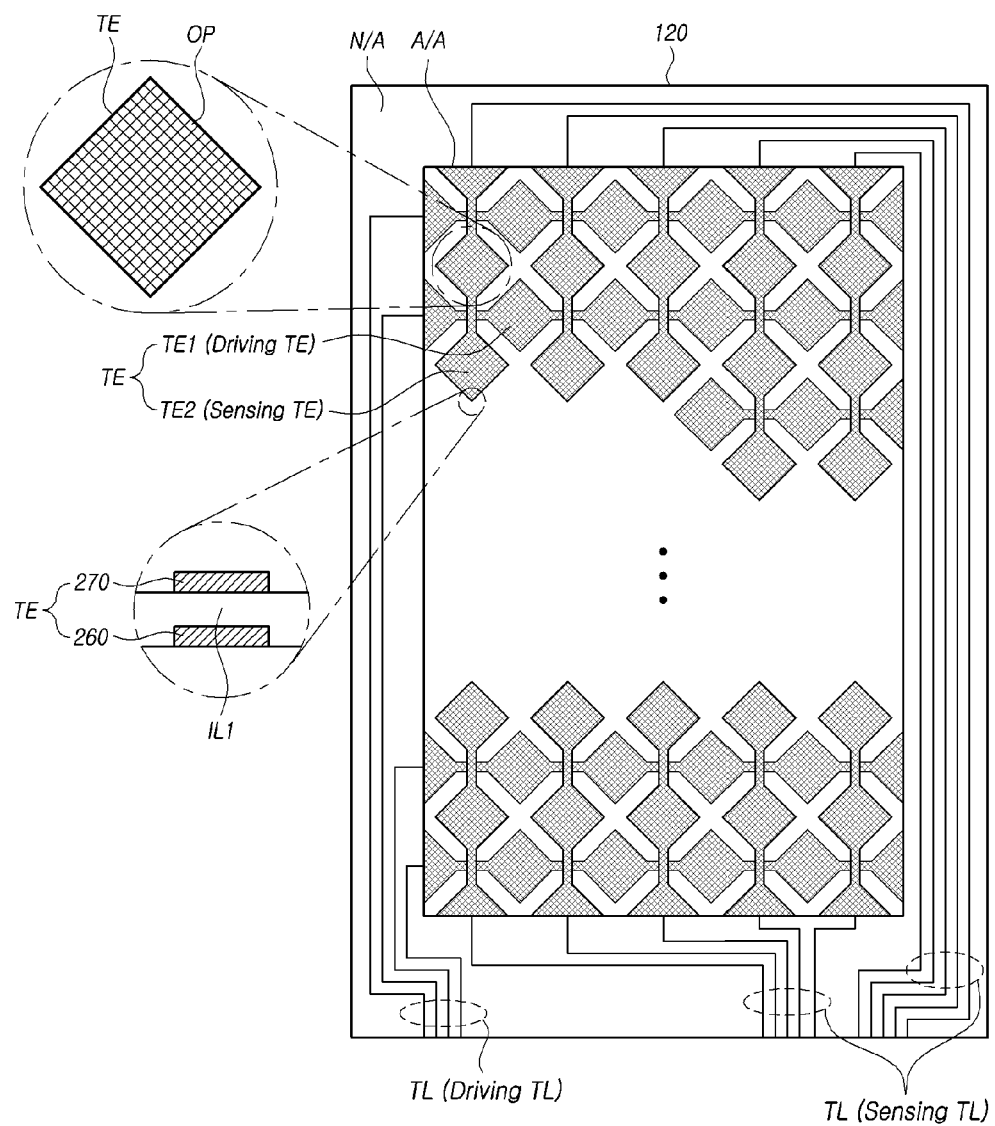
FIG. 2 schematically illustrates a structure of a touch panel including a plurality of touch sensing electrodes in a touch display device according to embodiments of the present disclosure.
Figure 3:
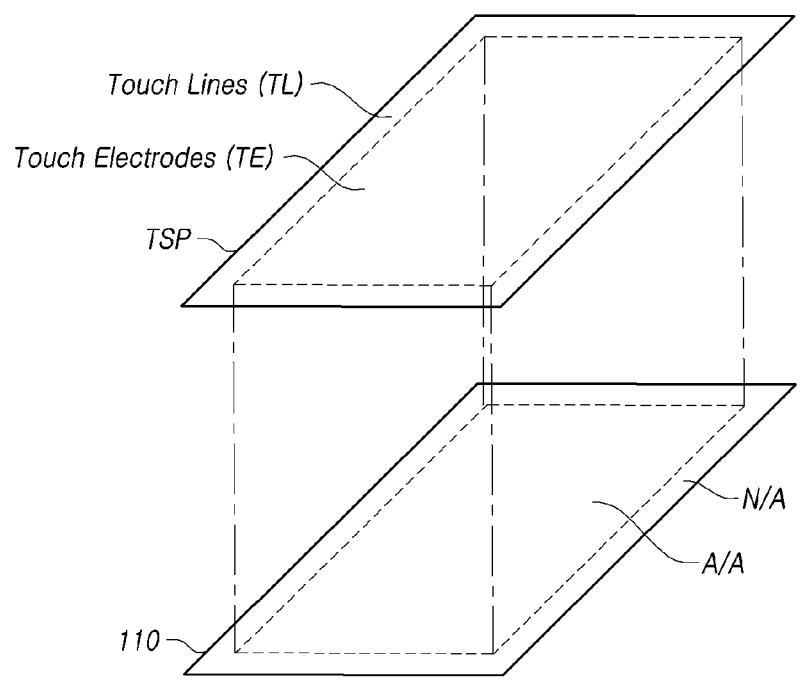
FIG. 3 illustrates an arrangement relationship between a display panel and a touch panel according to embodiments of the present disclosure.

FIG. 2 schematically illustrates a structure of a touch panel including a plurality of touch sensing electrodes in a touch display device according to embodiments of the present disclosure. FIG. 3 illustrates an arrangement relationship between a display panel and a touch panel according to embodiments of the present disclosure.

Referring to FIG. 2, a plurality of touch electrodes TE are disposed on the touch panel 120, and touch lines TL for electrically connecting the touch electrodes TE and the touch circuit may be disposed.

The plurality of touch electrodes TE may be formed in a mesh shape including a plurality of openings OP.

In addition, in order to electrically connect the touch lines TL and the touch sensing circuit TSC to the touch panel 120, there may be touch pads in contact with the touch sensing circuit TSC.

The touch electrodes TE and the touch lines TL may be disposed on the same layer or on different layers.

Meanwhile, in the case that the touch display device 100 utilizes the mutual-capacitance-based touch sensing method, two or more touch electrodes TE disposed in the same row (or the same column) may be electrically connected to each other to form one driving touch electrode line. Two or more touch electrodes TE disposed in the same column (or same row) may be electrically connected to form one sensing touch electrode line.

In the embodiment of FIG. 2, two or more touch electrodes TE forming one driving touch electrode line may be integrated and electrically connected, and two or more touch electrodes TE forming the one sensing touch electrode line may also be integrated and electrically connected.

Here, two or more touch electrodes forming one driving touch electrode line are referred to as driving touch electrodes TE1. Two or more touch electrodes TE forming one sensing touch electrode line are referred to as sensing touch electrodes TE2.

At least one touch line TL may be connected to each driving touch electrode line, and at least one touch line TL may be connected to each sensing touch electrode line.

At least one touch line TL connected to each driving touch electrode line is referred to as a driving touch line TL. At least one touch line TL connected to each sensing touch electrode line is referred to as a sensing touch line TL.

One touch pad may be connected to each one touch line TL.

Referring to FIG. 2, each of the plurality of touch electrodes TE, for example, as an outer contour, may have a rhombus shape, and in some cases, a rectangle (which may include a square), but is not limited thereto, and may have various other shapes.

In consideration of the display performance and touch performance of the touch display device 100, there may be designed various shapes of the touch electrode TE.

The plurality of touch electrodes TE disposed on the touch panel 120 may have a structure in which a first touch electrode 260 and a second touch electrode 270 disposed on different layers overlap each other with at least one insulating layer IL1 interposed therebetween The touch panel 120 in FIG. 2 is illustrated to be elongated in the column direction, but depending on the type (e.g., TV, monitor, mobile terminal, etc.) or design of the touch display device 100, the touch panel may be designed to be elongated in the row direction.

The touch panel 120 according to embodiments may be disposed outside the display panel 110 (external type), or may be disposed inside the display panel 110 (built-in type).

If the touch panel 120 is an external type, the touch panel 120 and the display panel 110 may be separately manufactured through different panel manufacturing processes and then bonded.

If the touch panel 120 is a built-in type, the touch panel 120 and the display panel 110 may be formed together through a single panel manufacturing process.

Referring to FIGS. 2 and 3, a display panel 110 may include an active area A/A in which an image is displayed and a non-active area N/A which is an area outside the active area A/A. Here, the active area A/A is also referred to as a display area, and the non-active area N/A is also referred to as a non-display area.

A plurality of sub-pixels defined by, or positioned at regions of overlap of, data lines and gate lines may be arranged in the active area A/A.

There may be disposed a plurality of lines and pads for connecting data lines, gate lines, and various signal lines in the active area A/A to a display driving circuit in the non-active area A/A.

A plurality of touch electrodes TE and a plurality of touch lines TL may be disposed on the touch panel 120.

The plurality of touch electrodes 270 may be positioned to correspond to the active area A/A of the display panel 110.

The plurality of touch lines TL may be positioned to correspond to the non-active area N/A of the display panel 110.

That is, the plurality of touch lines TL may be disposed outside the touch electrode area (the active area A/A or corresponding area thereto) in which the plurality of touch electrodes TE are disposed.

The touch panel 120 may be built-in or external to the display panel 110.

As described above, the touch electrodes 270 are disposed in the active area A/A of the display panel 110, and the touch lines TL are disposed in the non-active area N/A of the display panel 110, so that it is possible to provide touch sensing that matches the display state of the display panel.

In addition, referring to FIG. 2, each of the plurality of touch lines TL is electrically connected to a touch circuit.

Meanwhile, the structure of the electrodes included in the touch panel according to the embodiments of the present disclosure is not limited to the structure illustrated in FIG. 2.

The display panel 110 may be disposed under the touch panel 120.

It will be described a structure of the display panel 110 with reference to FIG. 4.

Figure 4:
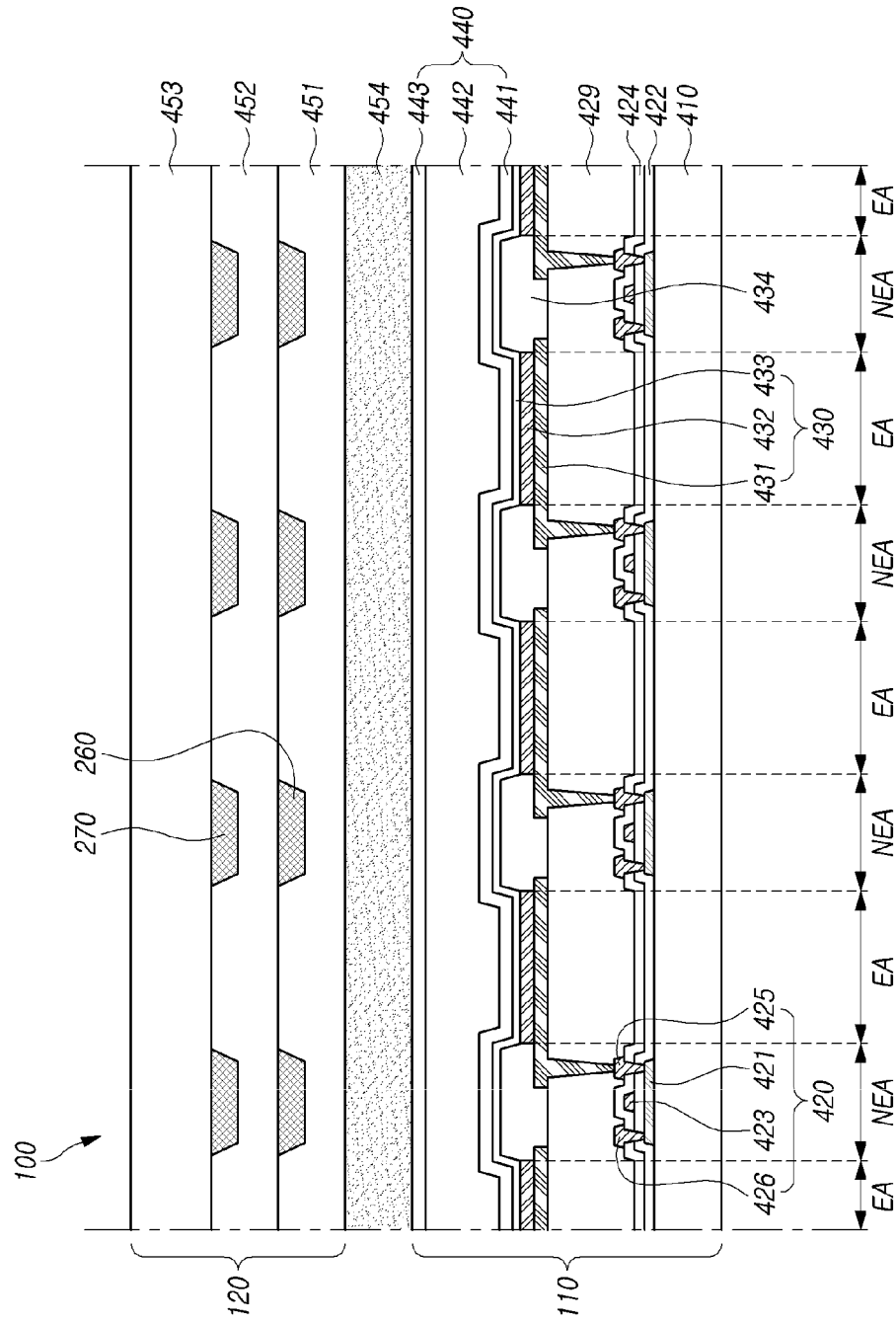
FIG. 4 illustrates a specific structure of an active area of a display panel of a touch display device and a structure of a touch panel disposed on the display panel according to embodiments of the present disclosure.

FIG. 4 illustrates a specific structure of an active area of a display panel of a touch display device and a structure of a touch panel disposed on the display panel according to embodiments of the present disclosure.

Referring to FIG. 4, the display panel 110 may include a substrate 410, a transistor 420, an electroluminescent device 430 and an encapsulation portion 440.

The substrate 410 may be formed by a material having a bendable or foldable property.

For example, the substrate 410 may include polyethersulfone, polyacrylate, polyetherimide, polyethelenen napthalate, polyethyelene terepthalate, polyphenylene sulfide, polyarylate, polyimide, polycarbonate, photoacrylic or a polymer resin such as cellulose acetate propionate (CAP). However, the material of the substrate 410 according to the present specification is not limited thereto, and the substrate 410 may be formed of glass or an insulated metal thin film.

At least one transistor 420 may be disposed on the substrate 410. The transistor 420 of FIG. 4 may be a driving transistor electrically connected to the electroluminescent device 430.

The transistor 420 may include an active layer 421, a gate electrode 423, a source electrode 425 and a drain electrode 426.

Specifically, at least one active layer 421 may be disposed on the substrate 410.

Although not shown, at least one buffer layer may be further disposed between the substrate 410 and the active layer 421.

A gate insulating layer 422 including an inorganic insulating material may be disposed on the active layer 421.

The gate electrode 423 may be disposed on the gate insulating layer 422. Although FIG. 4 illustrates the configuration in which the gate electrode 423 is a single layer, the gate electrode 423 according to the present specification may have a multilayer structure of two or more layers.

An interlayer insulating layer 424 including an inorganic insulating material may be disposed on the gate electrode 423.

The source electrode 425 and the drain electrode 426 may be disposed on the interlayer insulating layer to be spaced apart from each other. Although FIG. 4 illustrates a configuration in which the source electrode 425 and the drain electrode 426 are a single layer, the structure of the source electrode 425 and the drain electrode 426 according to the present specification is not limited thereto, the source electrode 425 and the drain electrode 426 may have a multilayer structure of two or more layers.

Each of the source electrode 425 and the drain electrode 426 may be in contact with the active layer 421 through a contact hole provided in the interlayer insulating layer 424 and the gate insulating layer 422.

A planarization layer 429 including an organic insulating material may be disposed on the source electrode 425 and the drain electrode 426.

Although not shown, a passivation layer including an inorganic insulating material may be further disposed between the source electrode 425 and the drain electrode 426 and the planarization layer 429.

The electroluminescent device 430 may include a first electrode 431, a light emitting layer 432 and a second electrode 433. Here, the first electrode 431 may be an anode of the electroluminescent device 430, and the second electrode 433 may be a cathode of the electroluminescent device 430. However, the configuration of the present specification is not limited thereto, and the first electrode 431 may be a cathode of the electroluminescent device 430, and the second electrode 433 may be an anode of the electroluminescent device 430.

However, in the following description, for convenience of description, there will be mainly described the configuration in which the first electrode 431 of the electroluminescent device 430 is an anode and the second electrode 433 is a cathode.

In the active area A/A of the display panel 110, a plurality of first electrodes 431 may be disposed on the planarization layer 429 to be spaced apart from each other.

In addition, each of the first electrodes 431 may be electrically connected to the source electrode 425 of one transistor 420 through a contact hole provided in the planarization layer 429.

Meanwhile, although FIG. 4 illustrates a structure in which the first electrode 431 of the electroluminescent device 430 is connected to the source electrode 425 of the transistor 420, the structure according to the present specification is not limited thereto. For example, the first electrode 431 may be connected to the drain electrode 426 of the transistor 420.

A bank 434 may be disposed on a portion of an upper surface of the first electrode 431 and a portion of an upper surface of the planarization layer 429.

The bank 434 may define or border an emission area EA and a non-emission area NEA in the active area A/A of the display panel 110. Specifically, in the active area A/A, an area in which the bank 434 is disposed may correspond to the non-emission area NEA, and an area in which the bank 434 is not disposed may correspond to the emission area EA.

The light emitting layer 432 may be disposed on an upper surface of the first electrode 431 that does not overlap the bank 434. The light emitting layer 432 may have a structure of a single layer or a double layer or more. For example, the light emitting layer 432 may be configured to further include a hole transport layer, an electron transport layer, and the like. The light emitting layer 432 may include a light emitting material corresponding to the color of each sub-pixel in order to display a specific color of each sub-pixel included in the active area A/A.

In the case that the light emitting layer 432 is an organic material, the electroluminescent device 430 may be referred to as an organic light emitting diode (OLED), and if the light emitting layer 432 is an inorganic insulating material, the electroluminescent device 430 may be referred to as an inorganic light emitting diode. For example, if an inorganic light emitting diode is formed using a quantum-dot material, the electroluminescent device 430 may be referred to as a quantum-dot light emitting diode.

The light emitting layer 432 may be individually disposed according to a unique color of each sub-pixel. However, the configuration of the light emitting layer 432 according to the present specification is not limited thereto, and if the color of all sub-pixels is white, the light emitting layer may be formed as a common layer. The common layer may mean a layer disposed in all areas of the active area A/A.

The second electrode 433 may be disposed on the light emitting layer 432 and the bank 434.

The second electrode 433 may be disposed to overlap the plurality of first electrodes 431 disposed in the active area A/A. That is, the first electrodes 431 disposed in the active area A/A may have a structure of sharing one second electrode 433.

The encapsulation portion 440 capable of preventing moisture or foreign substances from penetrating into the electroluminescent device 430 may be disposed on the second electrode 433. The encapsulation portion 440 may include at least two encapsulation layers including an inorganic insulating material and at least one encapsulation layer including an organic insulating material.

Specifically, the encapsulation portion 440 may include a first encapsulation layer 441, a second encapsulation layer 442 and a third encapsulation layer 443.

The first encapsulation layer 441 may be disposed on the second electrode 433, and may include an inorganic insulating material.

The second encapsulation layer 442 may be disposed on the first encapsulation layer 441, and may include an organic insulating material.

The third encapsulation layer 443 may be disposed on the second encapsulation layer 442, and may include an inorganic insulating material.

A touch panel 120 may be disposed on the third encapsulation layer 443.

The touch panel 120 may be attached on the third encapsulation layer 443 through an insulating layer 454 having an adhesive property.

The touch panel 120 may include a first insulating layer 451, a second insulating layer 452, a third insulating layer 453, a first touch electrode 260 and a second touch electrode 270.

Specifically, the first insulating layer 451 may be disposed on the insulating layer 454 having an adhesive property, and a plurality of first touch electrodes 260 may be disposed on the first insulating layer 451.

The second insulating layer 452 may be disposed on the first touch electrode 260 and the first insulating layer 451.

The plurality of second touch electrodes 270 may be disposed on the second insulating layer 452.

The third insulating layer 453 may be disposed on the second touch electrode 270 and the second insulating layer 452.

FIG. 4 illustrates a structure in which each of the plurality of first touch electrodes 260 and the plurality of second touch electrodes 270 is a single layer, but is not limited thereto. For example, the plurality of first and second touch electrodes 260 and 270 may have a multilayer structure of two or more layers.

Each of the first, second and third insulating layers 451, 452 and 453 may include an organic insulating material.

An upper surface and a rear surface of the first insulating layer 451 may have a flat shape. In particular, even when the plurality of first touch electrodes 260 are disposed on the upper surface of the first insulating layer 451, the upper surface of the first insulating layer 451 may have a flat shape without a step difference.

An upper and rear surfaces of the second insulating layer 452 may have a flat shape. Even if the plurality of first touch electrodes 260 are disposed on the rear surface of the second insulating layer 452, the rear surface of the second insulating layer 452 may have a flat shape without a step difference. In addition, even when the plurality of second touch electrodes 270 are disposed on the upper surface of the second insulating layer 452, the upper surface of the second insulating layer 452 may have a flat shape without a step difference.

An upper and rear surfaces of the third insulating layer 453 may have a flat shape. In particular, even when the plurality of second touch electrodes 270 are disposed on the rear surface of the third insulating layer 453, the rear surface of the third insulating layer 453 may have a flat shape without a step difference.

Accordingly, the touch panel 120 including the first, second and third insulating layers 451, 452, 453, a plurality of first touch electrodes 260, and a plurality of second touch electrodes 270 may be attached to the display panel 110 through the insulating layer 454 having an adhesive property without bubbles generated due to a step difference.

Accordingly, it is possible to solve the problems of adhesion defect and visibility defect due to the generation of bubbles.

Figure 5:
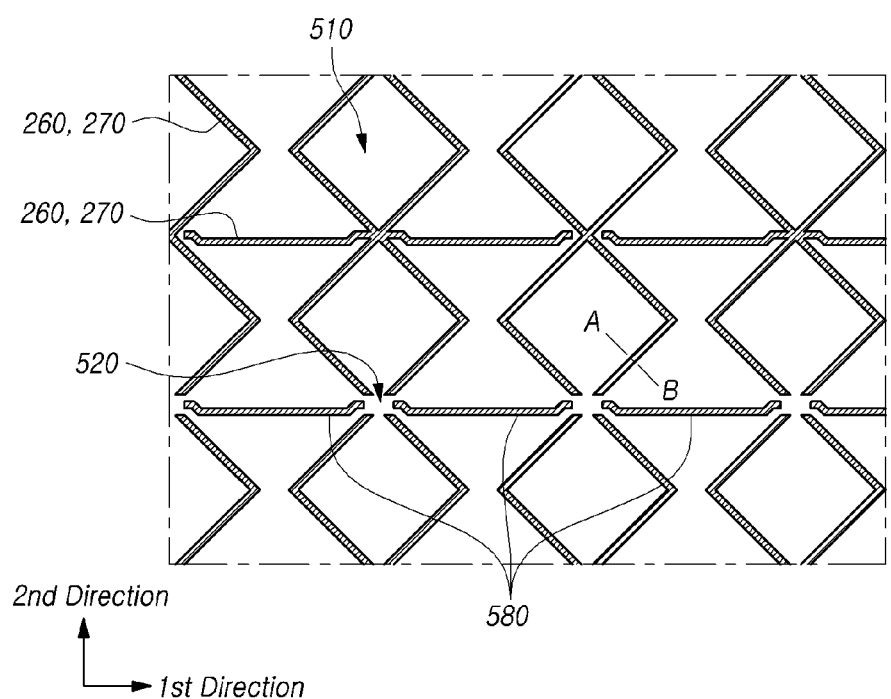
FIG. 5 schematically illustrates a structure of a touch panel according to embodiments of the present disclosure.

FIG. 5 schematically illustrates a structure of a touch panel according to embodiments of the present disclosure.

In describing the present embodiment, descriptions of the same or corresponding components as in the previous embodiment will be omitted. Hereinafter, the touch panel according to the present embodiment will be described with reference to the FIG. 5.

Referring to FIG. 5, a touch panel 120 of a touch display device 100 includes a plurality of first touch electrodes 260 and a plurality of second touch electrodes 270. The touch panel 120 may be driven in a manner that senses the amount of change in capacitance formed between the first touch electrode 260 and the second touch electrode 270.

In addition, the first touch electrode 260 and the second touch electrode 270 may be disposed to overlap each other in at least a partial area of the touch panel 120.

The first touch electrode 260 and the second touch electrode 270 overlapping each other may extend in a first direction.

In addition, other portions of the first touch electrode 260 and the second touch electrode 270 overlapping each other may extend in a second direction transverse the first direction. In addition, the first touch electrode 260 and the second touch electrode 270 overlapping each other extending in the second direction may cross the other first and second touch electrodes 260 and 270 overlapping each other extending in the second direction at least twice.

An opening 510 may be provided between the cross points of the first touch electrode 260 and the second touch electrode 270 overlapping each other and the other adjacent first and second touch electrodes 260 and 270.

Accordingly, a plurality of openings 510 may be provided in the touch panel 120. Here, the plurality of openings 510 may be formed by crossing the first and second touch electrodes 260 and 270 overlapping each other and different first and second touch electrodes 260 and 270.

However, the structures of the first and second touch electrodes 260 and 270 of the present specification are not limited thereto, and some of the plurality of openings 510 may be an area in which at least two first touch electrodes 260 cross each other, or at least two second touch electrodes 270 cross each other.

In a plan view, a shape of each of the plurality of openings 510 may be a rhombus or a diamond shape, but the shapes of the plurality of openings 510 according to embodiments of the present specification are not limited thereto, and may be modified and implemented in various shapes such as a polygon, an ellipse, and a circles shape.

In addition, the plurality of touch panels 120 may include at least one disconnection portion 520.

The disconnection portion 520 may be an area in which at least one of the first touch electrode 260 and the second touch electrode 270 is disconnected from the adjacent other first touch electrode 260 or the second touch electrode 270.

For example, in the case that the entire first touch electrode 260 included in the touch panel 120 is electrically connected and the entire second touch electrode 270 is electrically connected, if a defect occurs in a portion of the first touch electrode 260 and a portion of the second touch electrode 270, the entire touch panel 120 may not operate.

However, in the present embodiment, there is provided the disconnection portion 520, which is an area in which at least one of the first touch electrode 260 and the second touch electrode 270 is disconnected, so that the other second touch electrode 270 disconnected from the first touch electrode 260 or the second touch electrode 270 having a defect may be driven, thereby preventing a decrease in touch sensitivity of the touch panel 120.

In addition, in the case that the touch panel 120 includes a plurality of disconnection portions 520, the touch panel 120 may include at least one dummy pattern 580.

The dummy pattern 580 may be a portion cut off from the first touch electrode 260 or a portion cut off from the second touch electrode 270. In addition, the dummy pattern 580 may be a portion in which each of the first touch electrode 260 and the second touch electrode 270 is cut off. In this case, the dummy pattern 580 may have a structure in which a portion of the first touch electrode 260 and a portion of the second touch electrode 270 overlap.

The position and shape of the dummy pattern 580 in FIG. 5 are illustrated as an example, and the position and shape of the dummy pattern 580 may be variously modified.

In addition, a ratio (a dummy pattern ratio) of the area occupied by the dummy pattern 580 with respect to the size of one second touch electrode 270 or the first touch electrode 260 may be variously changed.

Meanwhile, in the case that the dummy pattern 580 does not exist in the touch panel 120, and the plurality of first touch electrodes 260 and the plurality of second touch electrodes 270 are disposed to cross the other first and second touch electrodes 260 and 270, there may be a problem that the outlines of the first and second touch electrodes 260 and 270 are visible on the display area.

However, one or more dummy patterns 580 are disposed on the touch panel 120, so that there may be solve the visibility problem that may occur when the first and second touch electrodes 260 and 270 are patterned in a mesh shape.

In addition, the presence/absence or number (dummy pattern ratio) of the dummy patterns 580 may be adjusted for each second touch electrode 270, so that the touch sensitivity may be improved by adjusting the capacitance for each second touch electrode 270.

If external light is incident on the touch display device 100 including the touch panel 120, the external light incident on the touch panel 120 may be reflected at the interface of the insulating layers of the touch panel 120. As a result, the light of the rainbow color may be visually recognized by the user, and the visibility of the touch display device 100 may be reduced.

Specifically, in the case that the external light is reflected at the boundary between the insulating layers due to the different refractive indices of the insulating layers stacked on the touch panel 120, since the path of the light is not constant similar to a diffuse reflection of the external light, the external light reflected from the boundary of the insulating layers of the touch panel 120 may be recognized as a rainbow color.

For example, if the refractive index of the third insulating layer 453 of FIG. 4 is smaller than the refractive index of the second insulating layer 452, external light passing through the third insulating layer 453 may be reflected from the boundary between the third insulating layer 453 and the second insulating layer 452 to be extracted to the outside. In this case, since the angle of reflection is different for each wavelength of light, the path of light in each wavelength band is not constant, so that light of colors included in the visible light wavelength band may be visually recognized by the user. That is, external light may be recognized as a rainbow color, and visibility may be deteriorated.

In addition, if the refractive index of the second insulating layer 452 of FIG. 4 is smaller than that of the first insulating layer 451, the light passing through the third and second insulating layers 453 and 452 may be reflected at the boundary between the second insulating layer 452 and the first insulating layer 451 and extracted to the outside. In this case, light of colors included in the visible wavelength band may be also recognized by the user, and the visibility of the touch display device 100 may be deteriorated.

Also, in the case that the refractive index of the first insulating layer 451 of FIG. 4 is smaller than that of the insulating layer 454, the light passing through the first, second and third insulating layers 451, 452 and 453 may be reflected at the boundary between the first insulating layer 451 and the insulating layer 454, so that light of colors included in the visible wavelength band may be recognized by the user, and the visibility of the touch display device 100 may be deteriorated.

In particular, when the touch display device 100 is viewed from a lateral direction (e.g., a direction other than a direction perpendicular to the surface of the touch panel), the external light reflected by the touch panel 120 of the touch display device 100 is refracted in components included in the touch panel 120, so that the visibility may be greatly reduced.

Accordingly, the touch panel 120 according to the embodiments of the present disclosure provides a touch panel having a structure with excellent visibility even when a user views the touch display device 100 from the lateral direction.

Figure 6:
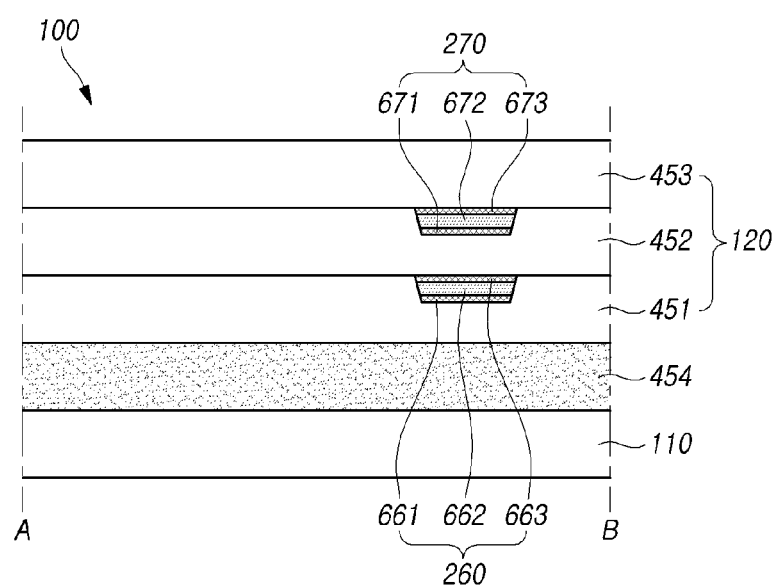
FIG. 6 is a cross-sectional view along line A-B of FIG. 5.

FIG. 6 is a cross-sectional view along line A-B of FIG. 5.

In describing the present embodiment, descriptions of the same or corresponding components as in the previous embodiment will be omitted. Hereinafter, the touch panel according to the present embodiment will be described with reference to the FIG. 6.

For example, with reference to FIG. 6, the display panel 110 constituting the touch display device 100 of the present embodiment, and the first, second and third insulating layers 451, 452 and 453 of the touch panel 120 may be the same as the display panel 110, the first, second and third insulating layers 451, 452 and 453 of and the touch panel 120 described above with reference to FIG. 4.

The touch display device 100 may include a touch panel 120 disposed on the display panel 110, and the touch panel 120 may be attached to one surface of the display panel 110 through an adhesive insulating layer 454 (hereinafter, referred to as a fourth insulating layer).

The touch panel 120 may be disposed in a direction in which light is emitted from the display panel 110.

The fourth insulating layer 454 may be disposed on one surface of the display panel 110, and a first insulating layer 451 of the touch panel 120 may be disposed on one surface of the fourth insulating layer 454.

A second insulating layer 452 may be disposed on the first insulating layer 451.

A plurality of first touch electrodes 260 may be disposed between the first insulating layer 451 and the second insulating layer 452.

The first touch electrode 260 may include a first electrode layer 661, a second electrode layer 662 disposed on the first electrode layer 661, and a third electrode layer 663 disposed on the second electrode layer 662.

Each of the first, second and third electrode layers 661, 662 and 663 may include a conductive metal. Each of the first, second and third electrode layers 661, 662 and 663 may include at least one of a metal such as aluminum (Al), gold (Au), silver (Ag), copper (Cu), tungsten (W), molybdenum (Mo), chromium (Cr), tantalum (Ta) and titanium (Ti), or an alloy thereof, but the present embodiments are not limited thereto.

If each of the first, second and third electrode layers 661, 662 and 663 includes the above-described conductive metal, the resistance of the plurality of first touch electrodes 260 may be lowered, and thus there may be advantageous for a large-area touch display device 100.

At least one of the first, second and third electrode layers 661, 662 and 663 may include a transparent conductive material. For example, at least one of the first, second and third electrode layers 661, 662 and 663 may include indium tin oxide (ITO), indium zinc oxide (IZO), zinc oxide (ZnO), indium tin zinc oxide (ITZO) or indium gallium zinc oxide (IGZO), but the present embodiments are not limited thereto.

In the case that the first, second and third electrode layers 661, 662 and 663 include a transparent conductive material, even if the first, second and third electrode layers 661, 662 and 663 overlap a part of the emission area EA due to a process error, there may be maintained the luminance of the touch display device 100.

A third insulating layer 453 may be disposed on the second insulating layer 452.

A plurality of second touch electrodes 270 may be disposed between the second insulating layer 452 and the third insulating layer 453.

The second touch electrode 270 may include a fourth electrode layer 671, a fifth electrode layer 672 disposed on the fourth electrode layer 671, and a sixth electrode layer 673 disposed on the fifth electrode layer 672.

Each of the fourth to sixth electrode layers 671, 672 and 673 may include a conductive metal. Each of the fourth to sixth electrode layers 671, 672 and 673 may include at least one of a metal such as aluminum (Al), gold (Au), silver (Ag), copper (Cu), tungsten (W), molybdenum (Mo), chromium (Cr), tantalum (Ta) and titanium (Ti), or an alloy thereof, but the present embodiments are not limited thereto.

If each of the fourth to sixth electrode layers 671, 672 and 673 includes the above-described conductive metal, the resistance of the plurality of second touch electrodes 270 may be lowered, and thus there may be advantageous for a large-area touch display device 100.

At least one of the fourth to sixth electrode layers 671, 672 and 673 may include a transparent conductive material. For example, at least one of the fourth to sixth electrode layers 671, 672 and 673 may include indium tin oxide (ITO), indium zinc oxide (IZO), zinc oxide (ZnO), and indium tin zinc oxide (ITZO) or indium gallium zinc oxide (IGZO), but the present embodiments are not limited thereto.

In the case that the fourth to sixth electrode layers 671, 672 and 673 include a transparent conductive material, even if the fourth to sixth electrode layers 671, 672 and 673 overlap a part of the emission area EA due to a process error, there may be maintained the luminance of the touch display device 100.

With respect to a direction in which the touch panel 120 is stacked in the display panel 110, a side surfaces of the plurality of first touch electrodes 260 and second touch electrodes 270 may have an inverse taper shape.

The touch display device 100 according to the present embodiments may be formed by manufacturing the display panel 110 and the touch panel 120, respectively, and then bonding the display panel 110 and the touch panel 120 through the fourth insulating layer 454.

Here, the touch panel 120 may be provided by disposing a plurality of second touch electrodes 270 on the third insulating layer 453, disposing a second insulating layer 452 on the plurality of second touch electrodes 270 and the third insulating layer 453, disposing a plurality of first touch electrodes 260 on the second insulating layer 452, and disposing the first insulating layer 451 on the plurality of first touch electrodes 260 and the second insulating layer 452.

In addition, one surface of the first insulating layer 451 is attached to one surface of the display panel 120 through the fourth insulating layer 454, so that there may be stacked on the display panel 120 opposite to the process order of forming the touch panel 120, and thus the shapes of the side surfaces of the plurality of first touch electrodes 260 and the plurality of second touch electrodes 270 may be formed in an inverse taper shape with respect to a direction of stacking the touch panel 120 is stacked on the display panel 110.

Even when the plurality of second touch electrodes 270 are disposed on the third insulating layer 453, and a second insulating layer 452 is disposed on the plurality of second touch electrodes 270 and the third insulating layer 453, one surface of the second insulating layer 452 (the opposite surface contacting the second touch electrode) may be formed flat without a step difference due to the plurality of second touch electrodes 270.

In addition, even when the plurality of first touch electrodes 260 are disposed on a surface opposite to one surface of the second insulating layer 452 contacting the plurality of second touch electrodes 270, and the first insulating layer 451 is disposed on the plurality of first touch electrodes 260 and the second insulating layer 452, one surface of the first insulating layer 451 (the opposite side contacting the first touch electrode) may be formed flat without a step difference due to the plurality of first touch electrode 260.

The fourth insulating layer 454 may include an organic insulating material. In addition, the fourth insulating layer 454 may have adhesive properties.

Accordingly, the flat surface of the first insulating layer 451 (i.e., the surface without the step difference due to the touch electrodes) is attached to the fourth insulating layer 454, so that there may be reduced an adhesion failure phenomenon in which air bubbles or the like is generated between the first insulating layer 451 and the fourth insulating layer 454.

The refractive index of each of the first, second and third insulating layers 451, 452 and 453 of the touch panel 120 may correspond to each other, that is, the same as each other. Accordingly, the light incident from the outside of the touch panel 120 is not reflected at the interface between the first insulating layer 451 and the second insulating layer 452 and at the interface between the second insulating layer 452 and the third insulating layer 453. Therefore, the light of the rainbow color may not be recognized by the user.

In addition, a refractive index of the fourth insulating layer 453 disposed between the display panel 110 and the touch panel 120 may correspond to the refractive index of each of the first, second and third insulating layers 451, 452 and 453, or may be lower than the refractive index of each of the first, second and third insulating layers 451, 452 and 453.

Accordingly, the light incident from the outside of the touch panel 120 is not reflected at the interface between the first insulating layer 451 and the fourth insulating layer 454, thereby preventing the user from recognizing the light of rainbow color and improving the visibility of the touch display device 100.

The refractive index of each of the first, second and third insulating layers 451, 452 and 453 may be selected in the range of 1.45 to 1.5, but the present embodiments are not limited thereto.

The refractive index of the fourth insulating layer 454 may be selected in the range of 1.4 to 1.5, but the present embodiments are not limited thereto.

Accordingly, the path of the external light incident on the touch panel 120 may not be bent while passing through the first, second and third insulating layers 451, 452 and 453. In addition, even at the interface between the first insulating layer 451 and the fourth insulating layer 454, the path of external light may not be bent or may be refracted to be incident on the display device 100.

A part of the external light incident on the display panel 110 is absorbed by components in the display panel 110 or is trapped at the boundary of a plurality of insulating layers having different refractive indices in the display panel 110, so that it is possible to prevent deterioration of visibility due to reflection of external light by reducing the amount emitted to the outside of the touch display device 100.

The first, second and third insulating layers 451, 452 and 453 may include an organic insulating material. For example, the first, second and third insulating layers 451, 452 and 453 may include organic insulating materials corresponding to each other. For example, the first, second and third insulating layers 451, 452 and 453 may include an acrylic organic insulating material (e.g., photoacrylic) or at least one of polystyrene, polymethylmethacrylate (PMMA), polyacrylonitrile (PAN), polyamide (PA), polyimide (PI), polyarylether (PAE), heterocyclic polymer, parylene, epoxy resin, benzocyclobutene (BCB), a siloxane-based resin and silane-based resin, but the present embodiments are not limited thereto.

In addition, in order to improve adhesion between the first and second insulating layers 451 and 452, and between the second and third insulating layers 452 and 453, there may be performed the surface treatment through plasma for the interface between the first insulating layer 451 and the second insulating layer 452 and the interface between the second insulating layer 452 and the third insulating layer 453, however the present embodiments are not limited thereto.

The touch display device according to the present embodiments is not limited thereto.

Figure 7:
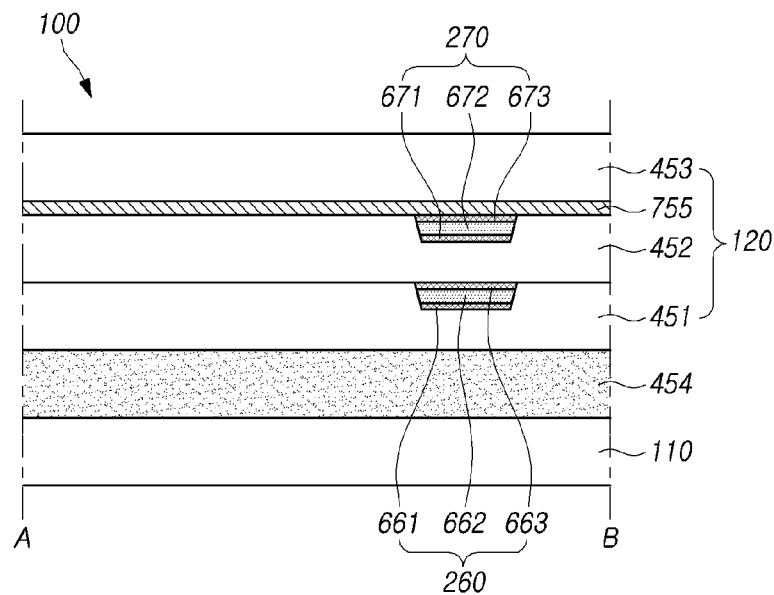
FIGS. 7 and 8 are cross-sectional views of a touch display device according to embodiments of the present disclosure.
Figure 8:
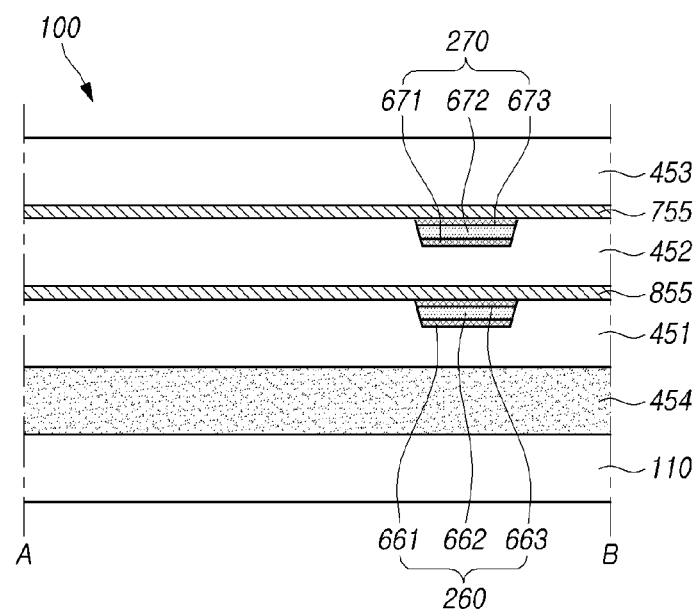

FIGS. 7 and 8 are cross-sectional views of a touch display device according to embodiments of the present disclosure.

In describing the present embodiment, descriptions of the same or corresponding components as in the previous embodiment will be omitted. Hereinafter, the touch display device according to the present embodiment will be described with reference to the FIGS. 7 and 8.

For example, with reference to FIGS. 7 and 8, the display panel 110 constituting the touch display device 100 of the present embodiment, and the fourth insulating layer 454, the first, second and third insulating layers 451, 452 and 453, and a plurality of first and second touch electrode 260 and 270 of the touch panel 120 may be the same as the display panel 110, the fourth insulating layer 454, the first, second and third insulating layers 451, 452 and 453, and the plurality of first and second touch electrode 260 and 270 of the touch panel 120 described above with reference to FIG. 6.

Referring to FIG. 7, a fifth insulating layer 755 may be disposed between the second insulating layer 452 and the third insulating layer 453 of the touch panel 120 illustrated in FIG. 6.

Specifically, the fifth insulating layer 755 may be disposed between the third insulating layer 453 and the plurality of second touch electrodes 270.

Each of the first, second and third insulating layers 451, 452 and 453 may include an organic insulating material.

The fifth insulating layer 755 may include an inorganic insulating material. For example, the fifth insulating layer 755 may be made of silicon oxide (SiOx), but the present embodiment is not limited thereto.

Since the first, second and third insulating layers 451, 452 and 453 include an organic insulating material and the fifth insulating layer 755 includes an inorganic insulating material, the thickness of the fifth insulating layer 755 may be thinner than the thickness of each of the first, second and third insulating layers 451, 452 and 453.

As described above, the fifth insulating layer 755 including the inorganic insulating material is disposed between the second insulating layer 452 and the third insulating layer 453 including the organic insulating material, so that it is possible to prevent moisture from penetrating into the plurality of first and second touch electrodes 260 and 270 included in the touch panel 120.

In particular, if the first and second touch electrodes 260 and 270 include the conductive metal described in FIG. 6 as an example, the plurality of first and second touch electrodes 260 and 270 provided in the touch panel 120 may be vulnerable to moisture.

In the present embodiment, the second insulating layer 452, the fifth insulating layer 755 and the third insulating layer 453 are stacked to serve as an encapsulation layer, so that it is possible to prevent moisture from penetrating into the plurality of first and second touch electrodes 260 and 270, thereby preventing the deterioration of properties of the electrodes.

As described above, since each of the second and third insulating layers 452 and 453 includes an organic insulating material, and the fifth insulating layer 755 disposed between the second insulating layer 452 and the third insulating layer 453 includes the inorganic insulating material, the second and third insulating layers 452 and 453 and the fifth insulating layer 755 may serve as an encapsulation layer included in the display panel 110.

In addition, the refractive index of each of the first, second and third insulating layers 451, 452 and 453 may correspond to each other. In addition, the refractive index of the fifth insulating layer 755 may correspond to the refractive index of each of the first, second and third insulating layers 451, 452 and 453, or may be lower than the refractive index of each of the first, second and third insulating layers 451, 452 and 453.

For example, the refractive index of each of the first, second and third insulating layers 451, 452 and 453 may be 1.45 to 1.5, and the refractive index of the fifth insulating layer 755 may be 1.4 to 1.45, but the present embodiment is not limited thereto.

In the case that the refractive index of each of the first, second and third insulating layers 451, 452 and 453 corresponds to the refractive index of the fifth insulating layer 755, a path of external light incident on the touch panel 120 may not be bent at interfaces between the first, second and third insulating layers 451, 452 and 453 and the fifth insulating layer 755. In addition, the light passing through the first insulating layer 451 may pass through the interface of the fourth insulating layer 454 without changing a path or may be refracted and passes through the fourth insulating layer 454, so that the light is finally incident on the display panel 120, and a portion of the external light incident on the display panel 110 may be absorbed by components in the display panel 110 and another portion may be trapped at a boundary between a plurality of insulating layers having different refractive indices in the display panel 110.

In the case that the refractive index of the fifth insulating layer 755 is lower than the refractive index of each of the first, second and third insulating layers 451, 452 and 453, the external light incident on the touch panel 120 may be refracted at the interface between the third insulating layer 453 and the fifth insulating layer 755 to be incident on the fifth insulating layer 755, and then may be further refracted at the interface between the fifth insulating layer 755 and the second insulating layer 452 to be incident on the second insulating layer 452.

In addition, the external light passing through the second insulating layer 452 and the first insulating layer 451 sequentially without a change in the path may pass through the fourth insulating layer 454 without a path change at the interface between the first insulating layer 451 and the fourth insulating layer 454, or may be refracted and passes through the fourth insulating layer 454, and thus may finally be incident on the display panel 120. In addition, a portion of external light incident on the display panel 110 may be absorbed by components in the display panel 110, and another portion may be trapped at a boundary between a plurality of insulating layers having different refractive indices in the display panel 110.

Accordingly, since the external light incident on the display panel 110 is not emitted to the outside of the touch display device 100, it is possible to prevent a decrease in visibility due to reflection of the external light.

When manufacturing the touch panel 120, a fifth insulating layer 755 may be disposed on the third insulating layer 453, and a plurality of second touch electrodes 270 may be disposed on the fifth insulating layer 755. Accordingly, the fifth insulating layer 755 may have a flat upper surface and a flat rear surface without a step difference due to the plurality of second touch electrodes 270.

Meanwhile, the structure of the touch panel 120 according to the present embodiments is not limited thereto, and may further include an additional insulating layer to prevent moisture from penetrating into the plurality of first and second touch electrodes 260 and 270.

Referring to FIG. 8, in the touch panel 120 of FIG. 7, a sixth insulating layer 855 may be disposed between the first insulating layer 451 and the second insulating layer 452 of the touch panel 120.

Specifically, the sixth insulating layer 855 may be disposed between the second insulating layer 452 and the plurality of first touch electrodes 260.

The sixth insulating layer 855 may include an inorganic insulating material. For example, the sixth insulating layer 855 may be made of silicon oxide (SiOx), but the present embodiment is not limited thereto.

Since the first, second and third insulating layers 451, 452 and 453 include an organic insulating material and the sixth insulating layer 855 includes an inorganic insulating material, the thickness of the sixth insulating layer 855 may be thinner than the thickness of each of the first, second and third insulating layers 451, 452 and 453.

As described above, the fifth insulating layer 755 including the inorganic insulating material is disposed between the second insulating layer 452 and the third insulating layer 453 including the organic insulating material, and the sixth insulating layer 855 including an inorganic insulating material is disposed between the second insulating layer 452 and the first insulating layer 451 including an organic insulating material, so that it is possible to prevent moisture from penetrating into the plurality of first and second touch electrodes 260 and 270 included in the touch panel 120.

Specifically, the touch panel 120 has a structure in which an insulating layer containing an organic insulating material and an insulating layer containing an inorganic insulating material are alternately stacked, and thus it is possible to prevent moisture from penetrating into the plurality of first and second touch electrodes 260 and 270.

The refractive index of the sixth insulating layer 855 may correspond to the refractive index of each of the first, second and third insulating layers 451, 452 and 453, or may be lower than the refractive index of each of the first, second and third insulating layers 451, 452 and 453.

The refractive index of the sixth insulating layer 855 may correspond to the refractive index of the fifth insulating layer 755. Although the sixth insulating layer 855 in FIG. 8 is added based on FIG. 7, the sixth insulating layer 855 and the fifth insulating layer 755 are independent components, that is, the sixth insulating layer 855 might be included without the fifth insulating layer 755.

For example, the refractive index of each of the first, second and third insulating layers 451, 452 and 453 may be 1.45 to 1.5, and the refractive indices of the fifth and sixth insulating layers 755 and 855 may be 1.4 to 1.45. However, the present embodiment is not limited thereto.

In the case that the refractive index of each of the first, second and third insulating layers 451, 452 and 453 corresponds to the refractive index of each of the fifth and sixth insulating layers 755 and 855, a path of the external light incident on the touch panel 120 may not be bent at the interfaces between the first, second and third insulating layers 451, 452 and 453 and the fifth insulating layer 755. The light passing through the first, second and third insulating layers 451, 452 and 453 and the fifth and sixth insulating layers 755 and 855 may pass through the interface of the first insulating layer 451 and the fourth insulating layer 454 without changing a path or may be refracted and passes through the fourth insulating layer 454, so that the light is finally incident on the display panel 120. In addition, a portion of the external light incident on the display panel 110 may be absorbed by components in the display panel 110 and another portion may be trapped at a boundary between a plurality of insulating layers having different refractive indices in the display panel 110.

In the case that the refractive index of the sixth insulating layer 855 is lower than the refractive index of each of the first, second and third insulating layers 451, 452 and 453, the external light incident on the touch panel 120 may be refracted at the interface between the third insulating layer 453 and the fifth insulating layer 755 to be incident on the fifth insulating layer 755, and then may be further refracted at the interface between the fifth insulating layer 755 and the second insulating layer 452 to be incident on the second insulating layer 452.

In addition, a refraction occurs at the interface between the second insulating layer 452 and the sixth insulating layer 855, and a refraction also occurs at the interface between the sixth insulating layer 855 and the first insulating layer 451, and the light may be incident on the first insulating layer 451.

The light sequentially passing through the second insulating layer 452 and the first insulating layer 451 may pass through the fourth insulating layer 454 without a path change at the interface between the first insulating layer 451 and the fourth insulating layer 454, or may be refracted and passed through the fourth insulating layer 454, and may be finally incident on the display panel 120. In addition, a portion of external light incident on the display panel 110 may be absorbed by components in the display panel 110, and another portion may be trapped at a boundary between a plurality of insulating layers having different refractive indices in the display panel 110.

Accordingly, since the external light incident on the display panel 110 is not emitted to the outside of the touch display device 100, it is possible to prevent a decrease in visibility due to reflection of external light, and at the same time, prevent the first and second touch electrodes 260 and 270 from being corroded by moisture.

When manufacturing the touch panel 120, the sixth insulating layer 855 may be disposed on the second insulating layer 452, and a plurality of first touch electrodes 260 may be disposed on the sixth insulating layer 855. Accordingly, the sixth insulating layer 855 may have a flat upper surface and a flat rear surface without a step difference due to the plurality of first touch electrodes 280. In particular, since one surface (the surface opposite to the surface in contact with the second touch electrode) of the second insulating layer 452 disposed under the sixth insulating layer 855 has a flat structure without a step difference due to the plurality of second touch electrodes 270, there may be no step difference in the upper surface and the rear surface of the sixth insulating layer 855 disposed on one surface of the second insulating layer 452.

Accordingly, as shown in FIGS. 7 and 8, even if the touch panel additionally includes fifth and sixth insulating layers 755 and 855, one surface of the first insulating layer 451 attached to the fourth insulating layer 454 may have a flat structure. Accordingly, the touch panel 120 may be attached to the fourth insulating layer 454 without air bubbles generated due to a step difference, thereby preventing adhesion failure.

The touch panel 120 according to the embodiments of the present disclosure may include an area corresponding to the active area A/A of the display panel 110 and an area corresponding to the non-active area N/A of the display panel 110.

The plurality of first and second touch electrodes 260 and 270 may be disposed in an area of the touch panel 120 corresponding to the active area A/A of the display panel 110.

At least one pad electrode may be disposed in an area of the touch panel 120 corresponding to the non-active area N/A of the display panel 110.

This structure will be described in detail with reference to FIGS. 9 and 10 as follows.

Figure 9:
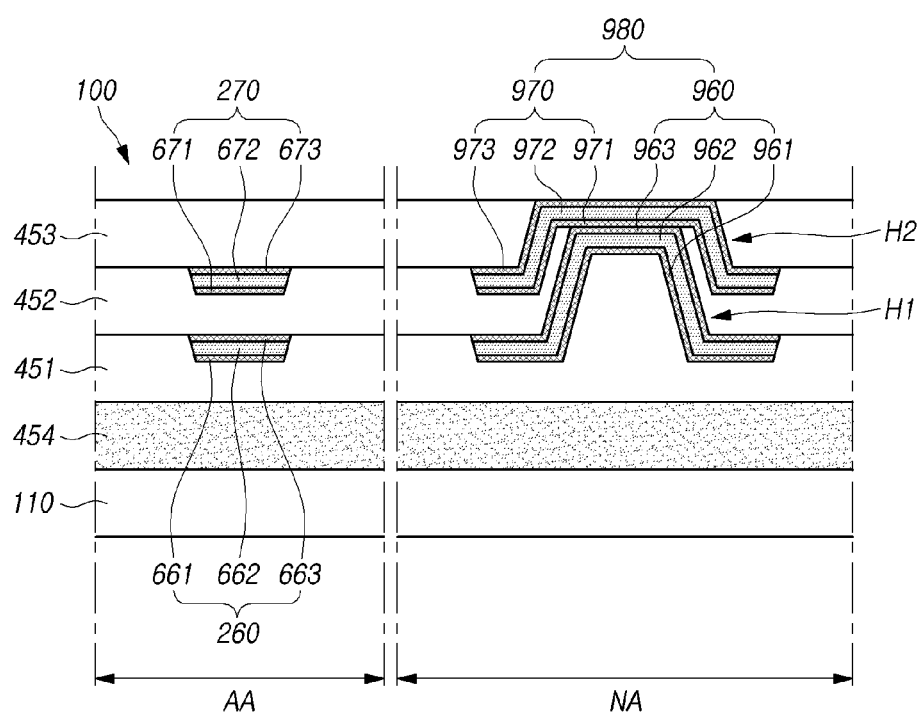
FIGS. 9 and 10 are cross-sectional views of a touch display device for a portion of an active area and a portion of the non-active area of the display panel according to the present embodiments.
Figure 10:
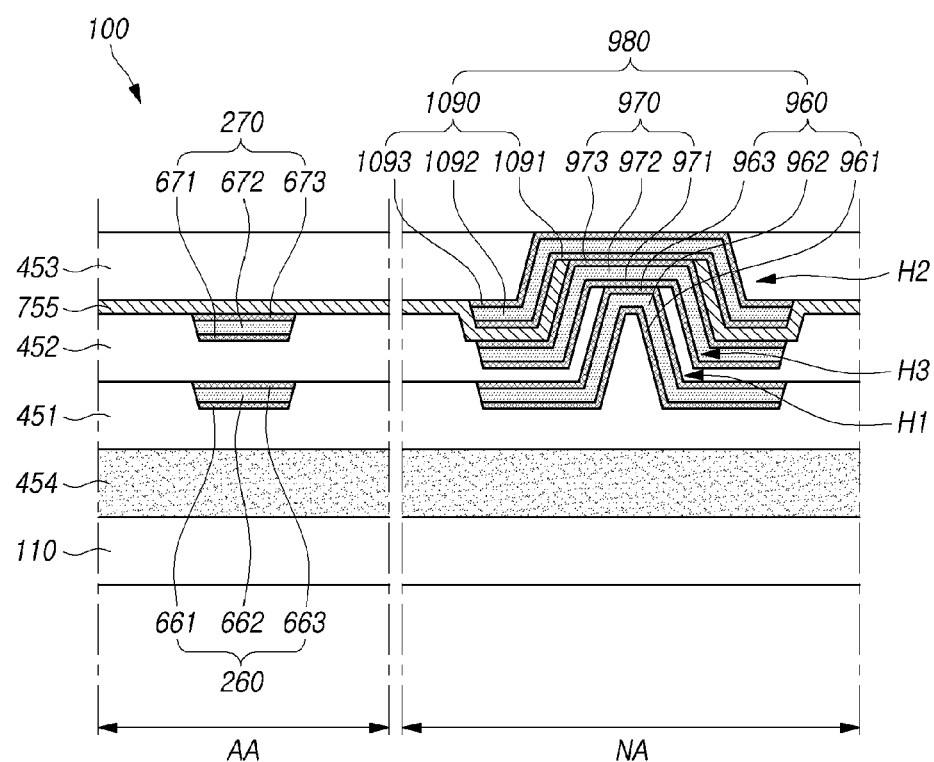

FIGS. 9 and 10 are cross-sectional views of a touch display device for a portion of an active area and a portion of the non-active area of the display panel according to the present embodiments.

In describing the present embodiment, descriptions of the same or corresponding components as in the previous embodiment will be omitted. Hereinafter, the touch display device according to the present embodiment will be described with reference to the FIGS. 9 and 10.

For example, with reference to FIG. 9, the display panel 110 constituting the touch display device 100 of the present embodiment, and the fourth insulating layer 454, the first, second and third insulating layers 451, 452 and 453, and a plurality of first and second touch electrode 260 and 270 of the touch panel 120 may be the same as the display panel 110, the fourth insulating layer 454, the first, second and third insulating layers 451, 452 and 453, and the plurality of first and second touch electrode 260 and 270 of the touch panel 120 described above with reference to FIG. 6.

In FIG. 10, the display panel 110 constituting the touch display device 100 of the present embodiment, and the fourth insulating layer 454, the first, second and third insulating layers 451, 452 and 453, the fifth insulating layer 755, and a plurality of first and second touch electrode 260 and 270 of the touch panel 120 may be the same as the display panel 110, the fourth insulating layer 454, the first, second and third insulating layers 451, 452 and 453, the fifth insulating layer 755, and the plurality of first and second touch electrode 260 and 270 of the touch panel 120 described above with reference to FIG. 7.

In addition, with reference to FIG. 10, a first touch pad electrode 960 and a second touch pad electrode 970 constituting the touch display device 100 of the present embodiment may be the same as a first touch pad electrode 960 and a second touch pad electrode 970 of FIG. 9.

First, referring to FIG. 9, a plurality of first and second touch electrodes 260 and 270 may be disposed in an area of the touch panel 120 corresponding to the active area A/A of the display panel 110.

A touch pad area may be provided in an area of the touch panel 120 corresponding to the non-active area N/A of the display panel 110, and at least one touch pad electrode 980 may be disposed in the touch pad area.

The at least one touch pad electrode 980 may include a first touch pad electrode 960 and a second touch pad electrode 970.

The first touch pad electrode 960 may be disposed on the same layer as the plurality of first touch electrodes 260.

Specifically, the first touch pad electrode 960 may be disposed between the first insulating layer 451 and the second insulating layer 452.

The first touch pad electrode 960 may include a first conductive layer 961, a second conductive layer 962 disposed on the first conductive layer 961, and third conductive layer 963 disposed on the second conductive layer 962.

A first electrode layer 661 and the first conductive layer 961 may be disposed on the same layer, a second electrode layer 662 and the second conductive layer 962 may be disposed on the same layer, and a third electrode layer 663 and the third conductive layer 963 may be disposed on the same layer.

That is, since the plurality of first touch electrodes 260 and the first touch pad electrodes 960 can be formed in the same process, there is an effect of simplifying the process.

Each of the first, second and third conductive layers 961, 962 and 963 may include a conductive metal. Each of the first, second and third conductive layers 961, 962 and 963 may include a metal such as aluminum (Al), gold (Au), silver (Ag), copper (Cu), tungsten (W), molybdenum (Mo), chromium (Cr), tantalum (Ta) and titanium (Ti), or an alloy thereof, but the present embodiments are not limited thereto.

At least one of the first, second and third conductive layers 961, 962 and 963 may include a transparent conductive material. For example, at least one of the first, second and third conductive layers 961, 962 and 963 may include at least one of indium tin oxide (ITO), indium zinc oxide (IZO), zinc oxide (ZnO), indium tin zinc oxide (ITZO) or indium gallium zinc oxide (IGZO), but the present embodiments are not limited thereto.

The second touch pad electrode 970 may be disposed on the same layer as the plurality of second touch electrodes 270.

Specifically, the second touch pad electrode 970 may be disposed between the second insulating layer 451 and the third insulating layer 453.

The second touch pad electrode 970 may include a fourth conductive layer 971, a fifth conductive layer 972 disposed on the fourth conductive layer 971, and a sixth conductive layer 973 disposed on the fifth conductive layer 972.

A fourth electrode layer 671 and the fourth conductive layer 971 may be disposed on the same layer, a fifth electrode layer 672 and the fifth conductive layer 972 may be disposed on the same layer, and a sixth electrode layer 673 and the sixth conductive layer 973 may be disposed on the same layer.

FIG. 9 illustrates a structure in which the first and second touch electrodes 260 and 270 and the first and second touch pad electrodes 960 and 970 have a triple layer structure, but embodiments are not limited thereto.

At least one of the first and second touch electrodes 260 and 270 and the first and second touch pad electrodes 960 and 970 may be formed of a single layer, a double layer, or a quadruple layer or more.

The first touch pad electrode 960 may contact a portion of the second touch pad electrode 970 through a first hole H1 provided in the second insulating layer 452.

At least a portion of a surface (a surface opposite to the surface contacting the first touch pad electrode) of the second touch pad electrode 970 may be exposed through a second hole H2 provided in the third insulating layer 453.

A portion of the second touch pad electrode 970 exposed through the second hole H2 may be connected to a circuit board on which a touch driving circuit is mounted.

The second insulating layer 452 may overlap a portion of the second hole H2. When forming the touch panel 120, the first touch pad electrode 960 is formed on the second insulating layer 452, and if the second insulating layer 452 does not overlap the second hole H2 (that is, if the second insulating layer is disposed only around the second hole), the first touch pad electrode 960 may be disconnected due to the step difference by the second insulating layer 452 around the second hole H2. That is, in the periphery of the second hole H2, the first touch pad electrode 960 may be disconnected due to a step difference occurring at the boundary between the portion where the second insulating layer 452 is disposed and the portion where the second insulating layer 452 is not disposed.

The first insulating layer 451 may be disposed in a region where the first hole H1 and the second hole H2 overlap. Specifically, the first insulating layer 451 may be filled in a portion where the step of the first touch pad electrode 960 forms due to the plurality of holes. Accordingly, the first insulating layer 451 may have a flat surface (a surface opposite to the surface in contact with the first touch pad electrode) without a step difference due to the first hole H1 and the second hole H2.

As a result, the flat surface of the first insulating layer 451 (i.e., a surface without the step difference due to the touch pad electrodes and the hole) is attached to the fourth insulating layer 454, so that it is possible to prevent an adhesion failure phenomenon in which air bubbles or the like is generated between the first insulating layer 451 and the fourth insulating layer 454.

Meanwhile, the structure of the touch panel 120 according to the present embodiments is not limited thereto.

Referring to FIG. 10, a fifth insulating layer 755 may be disposed between the second insulating layer 452 and the third insulating layer 453 of the touch panel 120 shown in FIG. 9.

A touch pad area may be provided in an area of the touch panel 120 corresponding to the non-active area N/A of the display panel 110, and at least one touch pad electrode 980 may be disposed in the touch pad area.

Each of at least one touch pad electrode 980 may include a first touch pad electrode 960, a second touch pad electrode 970, and a third touch pad electrode 1090.

The first touch pad electrode 960 may be disposed on the same layer as the plurality of first touch electrodes 260, and may be disposed between the first insulating layer 451 and the second insulating layer 452.

The second touch pad electrode 970 may be disposed on the same layer as the plurality of second touch electrodes 270.

Specifically, the second touch pad electrode 970 may be disposed between the second insulating layer 451 and the fifth insulating layer 755.

The third touch pad electrode 1090 may be disposed between the fifth insulating layer 755 and the third insulating layer 453.

The third touch pad electrode 1090 includes a seventh conductive layer 1091, an eighth conductive layer 1092 disposed on the seventh conductive layer 1091, and a ninth conductive layer 1093 disposed on the eighth conductive layer 1092.

Each of the seventh to ninth conductive layers 1091, 1092 and 1093 may include a conductive metal. Each of the seventh to ninth conductive layers 1091, 1092 and 1093 may include a metal such as aluminum (Al), gold (Au), silver (Ag), copper (Cu), tungsten (W), molybdenum (Mo), chromium (Cr), tantalum (Ta) and titanium (Ti), or an alloy thereof, but the present embodiments are not limited thereto.

At least one of the seventh to ninth conductive layers 1091, 1092 and 1093 may include a transparent conductive material. For example, at least one of the seventh to ninth conductive layers 1091, 1092 and 1093 may include at least one of indium tin oxide (ITO), indium zinc oxide (IZO), zinc oxide (ZnO), indium tin zinc oxide (ITZO) or indium gallium zinc oxide (IGZO), but the present embodiments are not limited thereto.

FIG. 10 illustrates a structure in which the third touch pad electrode 1090 has a triple layer structure, but embodiments are not limited thereto.

At least one of the third touch pad electrode 1090 may be formed of a single layer, a double layer, or a quadruple layer or more.

The first touch pad electrode 960 may contact a portion of the second touch pad electrode 970 through a first hole H1 provided in the second insulating layer 452.

The second touch pad electrode 970 may contact a portion of the third touch pad electrode 1090 through a third hole H3 provided in the fifth insulating layer 755.

At least a portion of a surface (a surface opposite to the surface contacting the second touch pad electrode) of the third touch pad electrode 1090 may be exposed through a second hole H2 provided in the third insulating layer 453.

A portion of the third touch pad electrode 1090 exposed through the second hole H2 may be connected to a circuit board on which a touch driving circuit is mounted.

The second insulating layer 452 may overlap a portion of the third hole H3. When forming the touch panel 120, the first touch pad electrode 960 is formed on the second insulating layer 452, and if the second insulating layer 452 does not overlap the third hole H3 (that is, if the second insulating layer is disposed only around the third hole), the first touch pad electrode 960 may be disconnected due to the step difference by the second insulating layer 452 around the third hole H3.

In addition, the fifth insulating layer 755 may overlap a portion of the second hole H2. When forming the touch panel 120, the second touch pad electrode 970 is formed on the fifth insulating layer 755, and if the fifth insulating layer 755 does not overlap the second hole H2 (that is, if the fifth insulating layer is disposed only around the second hole), the second touch pad electrode 970 may be disconnected due to the step difference by the fifth insulating layer 755 in the periphery of the second hole H2.

The first insulating layer 451 may be disposed in a region where the first hole H1, the second hole H2, and the third hole H3 overlap. Specifically, the first insulating layer 451 may be filled in a portion where the step of the first touch pad electrode 960 occurs due to the plurality of holes. Accordingly, the first insulating layer 451 may be formed to have a flat surface (a surface opposite to a surface in contact with the first touch pad electrode) without the step difference due to the first hole H1, the second hole H2 and the third hole H3.

Accordingly, the flat surface of the first insulating layer 451 (that is, the surface without the step difference due to the touch pad electrodes and the hole) may be attached to the fourth insulating layer 454, so that it is possible to reduce an adhesion failure phenomenon in which air bubbles or the like are generated between the first insulating layer 451 and the fourth insulating layer 454.

The structure of the touch pad area according to the embodiments of the present specification is not limited to FIGS. 9 and 10. For example, in the case that the touch display device 100 further includes the sixth insulating layer 855 shown in FIG. 8, the sixth insulating layer 855 may be further disposed between the first and second insulating layers 451 and 452 in the touch pad area of the touch display device 100 of FIG. 10. In this case, the sixth insulating layer 855 may have a hole in a region corresponding to the first hole H1, through which the first touch pad electrode 960 and the second touch pad electrode 970 are electrically connected.

FIG. 11 illustrates a reflection luminosity of the touch display device of the embodiments of the present disclosure according to the viewing angle.

In FIG. 11, the Example 1 includes the structure of the touch display device shown in FIG. 6, and the Example 2 includes the structure of the touch display device shown in FIG. 7.

The reflection luminosity of FIG. 11 illustrates the reflected light intensity or reflection luminosity at positions of 12° and 42° with respect to the front surface (direction perpendicular to the surface of the substrate of the display panel) of the touch display device. The reflection luminosity may mean the luminance of the reflected light.

Referring to FIG. 11, there may be identified that, in Example 1, the reflection luminosity is 0.02 cd when the viewing angle is 12°, and the reflected light intensity is 0.0002 cd when the viewing angle is 42°. Also, there may be identified that, in Example 2, the reflection luminosity is 0.01 cd when the viewing angle is 12°, and the reflected light intensity is 0.0001 cd when the viewing angle is 42°.

In particular, as shown in FIG. 11, in the case that the viewing angles are 12° and 42° in the structures of Examples 1 and 2, there can be identified that there is no phenomenon in which external light reflected from the touch panel is recognized as an rainbow color.

The touch display device 100 of the present disclosure may include a display panel 110 including an active area A/A and a non-active area N/A surrounding the active area A/A, and a touch panel disposed on the display panel, wherein the touch panel comprises: a first insulating layer 451 disposed on the display panel 110, a second insulating layer 452 disposed on the first insulating layer 451, a third insulating layer 453 disposed on the second insulating layer 452, a plurality of first touch electrodes 260 disposed between the first insulating layer 451 and the second insulating layer 452, and a plurality of second touch electrodes 270 disposed between the second insulating layer 452 and the third insulating layer 453. Each of the plurality of first touch electrodes 260 and each of the plurality of second touch electrodes 270 overlap each other, and a refractive index of each of the first insulating layer 451, the second insulating layer 452 and the third insulating layer 453 is the same.

The touch display device 100 may further include a fourth insulating layer 454 disposed between the display panel 110 and the first insulating layer 451, and the refractive index of the fourth insulating layer 454 may be the same as the refractive index of each of the first, second and third insulating layers 451, 452 and 453, or may be lower than the refractive index of each of the first, second and third insulating layers 451, 452 and 453.

The first, second, third and fourth insulating layers 451, 452, 453 and 454 may include organic insulating material.

The touch display device 100 may further include a fifth insulating layer 755 disposed between the second insulating layer 452 and the third insulating layer 453, and a refractive index of the fifth insulating layer 755 may be the same as the refractive index of each of the first, second and third insulating layers 451, 452 and 453, or may be lower than the refractive index of each of the first, second and third insulating layers 451, 452 and 453.

The first, second and third insulating layers 451, 452 and 453 may include an organic insulating material, and the fifth insulating layer 755 may include an inorganic insulating material.

The touch display device 100 may further include a sixth insulating layer 855 disposed between the first insulating layer and the second insulating layer, and a refractive index of the sixth insulating layer 855 may be the same as the refractive index of each of the first, second and third insulating layers 451, 452 and 453, or may be lower than the refractive index of each of the first, second and third insulating layers 451, 452 and 453.

The sixth insulating layer 855 may include an inorganic insulating material.

The active area of the display panel may include an emission area EA and a non-emission area NEA, and the plurality of first touch electrodes 260 and the plurality of second touch electrodes 270 may overlap with the non-emission area NEA.

The touch display device 100 of the present disclosure may include a touch pad area overlapped with the non-active area NA, wherein at least one first touch pad electrode 960 and at least one second touch pad electrode 970 may be disposed in the touch pad area, the first touch pad electrode 960 may be disposed on the same layer as the plurality of first touch electrodes 260, and the second touch pad electrode 970 may be disposed on the same layer as the plurality of second touch electrodes 270.

The first touch pad electrode 960 may be disposed between the first insulating layer 451 and the second insulating layer 452, and the second touch pad electrode 970 may be disposed between the second insulating layer 452 and the third insulating layer 453.

The first touch pad electrode 960 may be in contact with the second touch pad electrode 970 through a hole H1 in the second insulating layer 452.

The second touch pad electrode 970 may be connected to a circuit board mounting a touch driving circuit in an area overlapping a hole H2 of the third insulating layer 453.

The touch display device 100 may further include a third touch pad electrode 1090 disposed in the touch pad area, the second touch pad electrode 970 may be disposed on the first touch pad electrode 960, and the third touch pad electrode 1090 may be disposed on the second touch pad electrode 970.

The touch display device 100 may further include a fifth insulating layer 755 disposed between the second insulating layer 452 and the third insulating layer 453, wherein the first touch pad electrode 960 may be disposed between the first insulating layer 451 and the second insulating layer 452, the second touch pad electrode 970 may be disposed between the second insulating layer 452 and the fifth insulating layer 755, and the third touch pad electrode 1090 may be disposed between the fifth insulating layer 755 and the third insulating layer 453.

The first touch pad electrode 960 may be in contact with the second touch pad electrode 970 through a hole H1 in the second insulating layer 42, and the second touch pad electrode 970 may be in contact with the third touch pad electrode 1090 through a hole H3 in the fifth insulating layer 755.

The third touch pad electrode 1090 may be connected to a circuit board mounting a touch driving circuit in an area overlapping a hole H2 of the third insulating layer 453.

The first and second touch electrodes 260 and 270 overlapping each other may cross at least twice with other adjacent first and second touch electrodes 260 and 270, and an opening may be provided between the crossing points of the first and second touch electrodes 260 and 270 and the other adjacent first and second touch electrodes. Said another way, first and second touch electrodes 260 and 270 that overlap each other may cross at least twice with other first and second touch electrodes 260 and 270 adjacent thereto One surface of the first insulating layer 451 in contact with the plurality of first touch electrodes 260 and the opposite surface thereof may have a flat shape, and one surface of the second insulating layer 452 in contact with the plurality of second touch electrodes 270 and the opposite surface thereof may have a flat shape.

The first, second and third insulating layers 451, 452 and 453 may comprise organic insulating material.

The touch panel 120 may comprise at least one disconnection portion 520 and at least one dummy pattern 580, the disconnection portion 520 is an area in which at least one of the first touch electrode 260 and the second touch electrode 270 is disconnected, and the dummy pattern 580 is a portion cut off from the first touch electrode 260 or a portion cut off from the second touch electrode 270.

The touch panel 120 of the present disclosure may include a first insulating layer 451, a plurality of first touch electrodes 260 disposed on the first insulating layer 451, a second insulating layer 452 disposed on the plurality of first touch electrodes 260 and the first insulating layer 451, a plurality of second touch electrodes 270 disposed on the second insulating layer 452, and a third insulating layer 453 disposed on the plurality of second touch electrodes 270 and the second insulating layer 452, wherein a refractive index of each of the first insulating layer 451, the second insulating layer 452 and the third insulating layer 453 may be the same as each other.

In addition, the touch panel 120 may further include a fifth insulating layer 755 disposed between the second insulating layer 452 and the third insulating layer 453, and a refractive index of the fifth insulating layer 755 may be the same as the refractive index of each of the first, second and third insulating layers 451, 452 and 453, or may be lower than the refractive index of each of the first, second and third insulating layers 451, 452 and 453.

According to embodiment of the present disclosure, there are provided the first, second and third insulating layers having refractive indices corresponding to each other, so that there is an effect of improving visibility by preventing the external light reflected in the touch panel from being recognized by the user as a light of the rainbow color.

In addition, according to embodiments of the present disclosure, since external light is absorbed in the touch display device or is trapped in the touch display device and cannot be emitted to the outside, there is an effect of lowering the reflectance of external light.

In addition, according to embodiments of the present disclosure, the surface of the first insulating layer of the touch panel which is in contact with the insulating layer disposed on the display panel has a flat shape, so that it is possible to prevent adhesion defect in attaching the display panel and the touch panel.

Although the embodiments of the present disclosure have been described in more detail with reference to the accompanying drawings, the present disclosure is not necessarily limited to these embodiments, and various modifications may be possible within the scope without departing from the technical spirit of the present disclosure. Accordingly, the embodiments disclosed in the present disclosure are not intended to limit the technical spirit of the present disclosure, but to exemplarily explain the present disclosure, and the scope of the technical spirit of the present disclosure is not limited by these embodiments. Therefore, there should be understood that the embodiments described above are illustrative in all respects and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device comprising:
 a display panel comprising an active area and a non-active area surrounding the active area; and
 a touch panel disposed on the display panel, the touch panel including:
  a first insulating layer disposed on the display panel;
  a second insulating layer disposed on the first insulating layer;
  a third insulating layer disposed on the second insulating layer;
  a fourth insulating layer disposed between the display panel and the first insulating layer, the fourth insulating layer having an adhesive property;
  a plurality of first touch electrodes disposed between the first insulating layer and the second insulating layer;
  a plurality of second touch electrodes disposed between the second insulating layer and the third insulating layer;
  a first touch pad electrode disposed in a touch pad area overlapped with the non-active area, the first touch pad electrode and the plurality of first touch electrodes being disposed in a same layer as each other; and
  a second touch pad electrode in direct contact with the first touch pad electrode, the second touch pad electrode and the plurality of second touch electrodes being disposed in a same layer as each other, the second touch pad electrode being between the second insulating layer and the third insulating layer;

wherein each of the plurality of first touch electrodes overlaps a respective one of the plurality of second touch electrodes, wherein a refractive index of each of the first insulating layer, the second insulating layer and the third insulating layer is the same, wherein an upper surface of the first insulating layer is in contact with the plurality of first touch electrodes and a rear surface thereof has a flat shape, and an upper surface of the second insulating layer is in contact with the plurality of second touch electrodes and a rear surface thereof has a flat shape, and wherein the upper surface of the first insulating layer is in contact with the rear surface of the second insulating layer and the rear surface of the first insulating layer is in contact with the fourth insulating layer.

2. The touch display device of claim 1,
wherein a refractive index of the fourth insulating layer is the same as the refractive index of each of the first, second and third insulating layers, or the refractive index of the fourth insulating layer is lower than the refractive index of each of the first, second and third insulating layers.

3. The touch display device of claim 2, wherein the first, second, third and fourth insulating layers comprise organic insulating material.

4. The touch display device of claim 1, further comprising a fifth insulating layer disposed between the second insulating layer and the third insulating layer,
wherein a refractive index of the fifth insulating layer is the same as the refractive index of each of the first, second and third insulating layers, or the refractive index of the fifth insulating layer is lower than the refractive index of each of the first, second and third insulating layers.

5. The touch display device of claim 4, wherein the first, second and third insulating layers comprise an organic insulating material, and the fifth insulating layer comprises an inorganic insulating material.

6. The touch display device of claim 1, further comprising a sixth insulating layer disposed between the first insulating layer and the second insulating layer,
wherein a refractive index of the sixth insulating layer is the same as the refractive index of each of the first, second and third insulating layers, or the refractive index of the sixth insulating layer is lower than the refractive index of each of the first, second and third insulating layers.

7. The touch display device of claim 6, wherein the sixth insulating layer comprises an inorganic insulating material.

8. The touch display device of claim 1, wherein the active area of the display panel comprises an emission area and a non-emission area,
wherein the plurality of first touch electrodes and the plurality of second touch electrodes overlap with the non-emission area.

9. The touch display device of claim 1,
wherein the second touch pad electrode is partially covered by the third insulating layer.

10. The touch display device of claim 9, further comprising a third touch pad electrode disposed in the touch pad area, wherein the second touch pad electrode is disposed on the first touch pad electrode, and the third touch pad electrode is disposed on the second touch pad electrode.

11. The touch display device of claim 10, further comprising a fifth insulating layer disposed between the second insulating layer and the third insulating layer,
wherein the first touch pad electrode is disposed between the first insulating layer and the second insulating layer, the second touch pad electrode is disposed between the second insulating layer and the fifth insulating layer, and the third touch pad electrode is disposed between the fifth insulating layer and the third insulating layer.

12. The touch display device of claim 11, wherein the third touch pad electrode is connected to a circuit board having a touch driving circuit mounted thereon, the third touch pad electrode being connected to the circuit board in an area overlapping a hole of the third insulating layer.

13. The touch display device of claim 10, wherein the first touch pad electrode is in contact with the second touch pad electrode through a hole in the second insulating layer, and the second touch pad electrode is in contact with the third touch pad electrode through a hole in the fifth insulating layer.

14. The touch display device of claim 1, wherein the first touch pad electrode is disposed between the first insulating layer and the second insulating layer, and the second touch pad electrode is disposed between the second insulating layer and the third insulating layer.

15. The touch display device of claim 14, wherein the first touch pad electrode is in contact with the second touch pad electrode through a hole in the second insulating layer.

16. The touch display device of claim 15, wherein the second touch pad electrode is connected to a circuit board having a touch driving circuit mounted thereon, the second touch pad electrode being connected to the circuit board in an area overlapping a hole of the third insulating layer.

17. The touch display device of claim 1, wherein first and second touch electrodes that overlap each other cross at least twice with other first and second touch electrodes adjacent thereto, and
wherein an opening is provided between crossing points of the first and second touch electrodes and the other first and second touch electrodes adjacent thereto.

18. The touch display device of claim 17, wherein the touch panel comprises at least one disconnection portion and at least one dummy pattern, the disconnection portion is an area in which at least one of the first touch electrode and the second touch electrode is disconnected, and the dummy pattern is a portion cut off from the first touch electrode or a portion cut off from the second touch electrode.

19. The touch display device of claim 1, wherein the first, second and third insulating layers comprise organic insulating material.

20. The touch display device of claim 1, wherein the plurality of first touch electrodes, the plurality of second touch electrodes and the second insulating layer interposed therebetween are formed into a plurality of touch electrodes.

21. The touch display device of claim 20, wherein the plurality of touch electrodes includes a mesh shape including a plurality of openings.

22. The touch display device of claim 20, further comprising a plurality of touch lines electrically connecting to the plurality of touch electrodes,
wherein the plurality of touch electrodes and the plurality of touch lines are disposed on the same layer or on different layers.

23. The touch display device of claim 20, wherein the active area of the display panel comprises an emission area and a non-emission area,
wherein the plurality of touch electrodes overlap with the non-emission area.

24. The touch display device of claim 23, further comprising a bank defining the emission area and the non-emission area of the active area of the display panel,
wherein the plurality of touch electrodes overlap with the bank.

25. The touch display device of claim 20, further comprising a sensing electrode line electrically connected to at least one column or row of touch electrodes among the plurality of the touch electrodes.

26. The touch display device of claim 25, wherein the sensing electrode line is electrically connected to a plurality of touch lines at an upper portion and a lower portion of the column of the touch electrodes.

27. The touch display device of claim 25, wherein the sensing electrode line is electrically connected to a plurality of touch lines at one of a right portion and a left portion of the row of the touch electrodes.

28. A touch panel comprising:
a first insulating layer;
a plurality of first touch electrodes disposed on the first insulating layer;
a second insulating layer disposed on the plurality of first touch electrodes and the first insulating layer;
a plurality of second touch electrodes disposed on the second insulating layer;
a third insulating layer disposed on the plurality of second touch electrodes and the second insulating layer;
a fourth insulating layer having an adhesive property;
a first touch pad electrode disposed in a touch pad area overlapped with the non-active area, the first touch pad electrode and the plurality of first touch electrodes being disposed in a same layer as each other; and
a second touch pad electrode in direct contact with the first touch pad electrode, the second touch pad electrode and the plurality of second touch electrodes being disposed in a same layer as each other, the second touch pad electrode being between the second insulating layer and the third insulating layer;
wherein a refractive index of each of the first insulating layer, the second insulating layer and the third insulating layer is the same as each other,
wherein an upper surface of the first insulating layer is in contact with the plurality of first touch electrodes and a rear surface thereof has a flat shape, and an upper surface of the second insulating layer is in contact with the plurality of second touch electrodes and a rear surface thereof has a flat shape, and
wherein the upper surface of the first insulating layer is in contact with the rear surface of the second insulating layer and the rear surface of the first insulating layer is in contact with the fourth insulating layer.

29. The touch panel of claim 28, further comprising a fifth insulating layer disposed between the second insulating layer and the third insulating layer,
wherein a refractive index of the fifth insulating layer is the same as the refractive index of each of the first, second and third insulating layers, or is lower than the refractive index of each of the first, second and third insulating layers.

30. A touch display device comprising:
a display panel including an active area and a non-active area adjacent the active area;
a touch panel disposed on the display panel, the touch panel including:
a first insulating layer disposed on the display panel;
a second insulating layer disposed on the first insulating layer, the second insulating layer including a planarization layer;
a third insulating layer disposed on the second insulating layer, the third insulating layer including a planarization layer;
a fourth insulating layer disposed between the display panel and the first insulating layer, the fourth insulating layer having an adhesive property;
a plurality of first touch electrodes disposed between the first insulating layer and the second insulating layer; and
a plurality of second touch electrodes disposed between the second insulating layer and the third insulating layer,
a touch pad area overlapped with the non-active area, the touch pad area including:
a first touch pad electrode disposed in the same layer as the plurality of first touch electrodes, the first touch pad electrode being disposed between the first insulating layer and the second insulating layer; and
a second touch pad electrode disposed in the same layer as the plurality of second touch electrodes, the second touch pad electrode being disposed between the second insulating layer and the third insulating layer;
wherein each of the plurality of first touch electrodes overlaps a respective one of the plurality of second touch electrodes,
wherein a refractive index of each of the first insulating layer, the second insulating layer and the third insulating layer is the same,
wherein the plurality of first touch electrodes is positioned at an upper surface of the first insulating layer and a rear surface thereof has a flat shape,
wherein the plurality of second touch electrodes is positioned at an upper surface of the second insulating layer and a rear surface thereof has a flat shape, and
wherein the upper surface of the first insulating layer is in contact with the rear surface of the second insulating layer and the rear surface of the first insulating layer is in contact with the fourth insulating layer.

* * * * *